US012703788B2

(12) United States Patent
Brigandi et al.

(10) Patent No.: US 12,703,788 B2
(45) Date of Patent: Aug. 11, 2026

(54) THERMOPLASTIC COMPOSITIONS COMPRISING RECYCLED POLYMERS AND ARTICLES MANUFACTURED THEREFROM

(71) Applicant: Dow Global Technologies LLC, Midland, MI (US)

(72) Inventors: Paul J. Brigandi, Wayne, PA (US); Mohamed Esseghir, Lawrenceville, NJ (US); Kumar N. Sanketh, Pearland, TX (US); Chuan C. He, Dunbar, WV (US); Mridula Kapur, Lake Jackson, TX (US); Andrew T. Heitsch, Angleton, TX (US); John F. Szul, Hurricane, WV (US)

(73) Assignee: Dow Global Technologies LLC, Midland, MI (US)

( * ) Notice: Subject to any disclaimer, the term of this patent is extended or adjusted under 35 U.S.C. 154(b) by 430 days.

(21) Appl. No.: 18/019,702

(22) PCT Filed: Jul. 7, 2021

(86) PCT No.: PCT/US2021/040645
§ 371 (c)(1),
(2) Date: Feb. 3, 2023

(87) PCT Pub. No.: WO2022/031398
PCT Pub. Date: Feb. 10, 2022

(65) Prior Publication Data
US 2023/0272196 A1 Aug. 31, 2023

Related U.S. Application Data

(60) Provisional application No. 63/061,350, filed on Aug. 5, 2020.

(51) Int. Cl.
*C08L 23/0807* (2025.01)
*C08K 3/04* (2006.01)
*C09D 123/08* (2006.01)

(52) U.S. Cl.
CPC ............ *C08L 23/0815* (2013.01); *C08K 3/04* (2013.01); *C09D 123/0815* (2013.01); *C08L 2203/202* (2013.01); *C08L 2205/025* (2013.01); *C08L 2207/20* (2013.01)

(58) Field of Classification Search
CPC .......... C08L 23/04; C08L 23/06; C08L 23/08; C08L 23/0807; C08L 23/0815
See application file for complete search history.

(56) References Cited

U.S. PATENT DOCUMENTS 3,709,853 A 1/1973 Karapinka
4,003,712 A 1/1977 Miller
4,011,382 A 3/1977 Levine et al.
4,302,566 A 11/1981 Karol et al.
4,543,399 A 9/1985 Jenkins, III et al.
4,665,208 A 5/1987 Welborn, Jr. et al.
4,874,734 A 10/1989 Kioka et al.
4,882,400 A 11/1989 Dumain et al.
4,908,463 A 3/1990 Bottelberghe
4,924,018 A 5/1990 Bottelberghe
4,952,540 A 8/1990 Kioka et al.
4,968,827 A 11/1990 Davis
5,041,584 A 8/1991 Crapo et al.
5,091,352 A 2/1992 Kioka et al.
5,103,031 A 4/1992 Smith, Jr.
5,157,137 A 10/1992 Sangokoya
5,204,419 A 4/1993 Tsutsui et al.
5,206,199 A 4/1993 Kioka et al.
5,235,081 A 8/1993 Sangokoya
5,248,801 A 9/1993 Sangokoya
5,329,032 A 7/1994 Tran et al.
5,352,749 A 10/1994 DeChellis et al.
5,473,202 A 12/1995 Mudge et al.
5,541,270 A 7/1996 Chinh et al.
5,648,310 A 7/1997 Wasserman et al.
5,665,818 A 9/1997 Tilston et al.
5,677,375 A 10/1997 Rifi et al.
5,688,880 A 11/1997 Spencer et al.
5,770,755 A 6/1998 Schertl et al.
(Continued)

FOREIGN PATENT DOCUMENTS

CA 2741603 C 9/2013
CN 104672593 A 6/2015
(Continued)

OTHER PUBLICATIONS

Singapore Search Report and Written Opinion dated Mar. 4, 2025, pertaining to SG Patent Application No. 11202300578Y, 9 pgs.
Singapore Search Report and Written Opinion dated Mar. 4, 2025, pertaining to SG Patent Application No. 11202300726W, 9 pgs.
Communication pursuant to Article 94(3) EPC dated Oct. 18, 2024, pertaining to EP Patent Application No. 21756092.9, 6 pgs.
International Search Report and Written Opinion dated May 11, 2021, pertaining to International Patent Application No. PCT/US2021/040644, 9 total pages.
(Continued)

*Primary Examiner* — Jeffrey S Lenihan
(74) *Attorney, Agent, or Firm* — Dinsmore & Shohl LLP

(57) ABSTRACT

In various embodiments, a thermoplastic composition may comprise from 0.5 wt. % to 75.0 wt. % of recycled polyethylene comprising a blend of polyethylene recovered from post-consumer material, pre-consumer material, or combinations thereof, and from 25.0 wt. % to 99.5 wt. % of virgin raw polyethylene comprising unimodal polyethylene, bimodal polyethylene, or combinations thereof, wherein at least 90.0 wt. % of the thermoplastic composition is comprised of the post-consumer recycled polyethylene and the virgin raw polyethylene. Manufactured articles made from the thermoplastic composition, such as coated conductors, are also provided.

14 Claims, 2 Drawing Sheets

(56) References Cited

U.S. PATENT DOCUMENTS

| | | | | |
|---|---|---|---|---|
| 5,798,427 | A | 8/1998 | Foster et al. | |
| 5,889,128 | A | 3/1999 | Schrock et al. | |
| 5,965,477 | A | 10/1999 | Sivaram et al. | |
| 5,972,510 | A | 10/1999 | O'Hare et al. | |
| 5,998,558 | A | 12/1999 | Wasserman et al. | |
| 6,034,187 | A | 3/2000 | Maehama et al. | |
| 6,063,871 | A | 5/2000 | Kishine et al. | |
| 6,159,617 | A | 12/2000 | Foster et al. | |
| 6,340,730 | B1 | 1/2002 | Murray et al. | |
| 6,403,717 | B1 | 6/2002 | Adams et al. | |
| 6,472,484 | B1 | 10/2002 | Abe et al. | |
| 7,037,977 | B2 | 5/2006 | Miserque et al. | |
| 7,230,054 | B2 | 6/2007 | Mavridis et al. | |
| 7,812,094 | B2 | 10/2010 | Kvamme et al. | |
| 7,943,700 | B2 | 5/2011 | Crowther et al. | |
| 8,378,029 | B2 | 2/2013 | Liu et al. | |
| 9,512,307 | B2 | 12/2016 | Mathur et al. | |
| 10,053,563 | B2 | 8/2018 | Trolez et al. | |
| 10,087,296 | B2 | 10/2018 | Ek et al. | |
| 10,308,798 | B2 | 6/2019 | Ek et al. | |
| 2002/0119890 | A1 | 8/2002 | Wenzel et al. | |
| 2004/0062942 | A1 | 4/2004 | Lustiger et al. | |
| 2004/0240809 | A1 | 12/2004 | Tedder et al. | |
| 2005/0119413 | A1 | 6/2005 | Maziers | |
| 2008/0114131 | A1 | 5/2008 | Harris et al. | |
| 2015/0031540 | A1 | 1/2015 | Burton et al. | |
| 2015/0357081 | A1 | 12/2015 | Mizuno et al. | |
| 2016/0002450 | A1 | 1/2016 | Chiba et al. | |
| 2016/0009908 | A1 | 1/2016 | Chiba et al. | |
| 2020/0199270 | A1 | 6/2020 | Zhang et al. | |
| 2023/0242744 | A1 * | 8/2023 | Liu | C08L 23/08 524/528 |
| 2024/0110041 | A1 * | 4/2024 | Van Mierloo | C08K 5/524 |

FOREIGN PATENT DOCUMENTS

| | | | |
|---|---|---|---|
| CN | 104870549 | A | 8/2015 |
| CN | 105086076 | A | 11/2015 |
| CN | 106519391 | A | 3/2017 |
| CN | 107304283 | A | 10/2017 |
| CN | 108384090 | A | 8/2018 |
| CN | 111183160 | A | 5/2020 |
| EP | 0517868 | B1 | 12/1991 |
| EP | 0664301 | B1 | 1/1994 |
| EP | 0279586 | B1 | 5/1994 |
| EP | 0802202 | B1 | 5/1994 |
| EP | 0802203 | B1 | 4/1997 |
| EP | 0516476 | B1 | 10/1997 |
| EP | 0893454 | A1 | 2/1998 |
| EP | 0511665 | B1 | 7/1998 |
| EP | 0594218 | B1 | 3/1999 |
| EP | 0767184 | B1 | 8/1999 |
| EP | 0561476 | B1 | 9/1999 |
| EP | 0794200 | B1 | 7/2000 |
| EP | 1739103 | A1 | 1/2007 |
| EP | 1752462 | B1 | 3/2009 |
| EP | 2353169 | B1 | 10/2009 |
| EP | 2907843 | B1 | 11/2017 |
| EP | 3406666 | A1 | 11/2018 |
| JP | 2009235367 | A | 10/2009 |
| JP | 2011210418 | A | 10/2011 |
| JP | 2020514430 | A | 5/2020 |
| KR | 102019261 | B1 | 3/2019 |
| WO | 1994010180 | A | 5/1994 |
| WO | 1997003124 | A | 1/1997 |
| WO | 1997028170 | A | 8/1997 |
| WO | 1998032776 | A | 7/1998 |
| WO | 1999040125 | A | 8/1999 |
| WO | 1999047598 | A | 9/1999 |
| WO | 1999048605 | A | 9/1999 |
| WO | 1999050311 | A | 10/1999 |
| WO | 1999060033 | A | 11/1999 |
| WO | 1999061489 | A | 12/1999 |
| WO | 2003010208 | A1 | 2/2003 |
| WO | 2003033587 | A1 | 4/2003 |
| WO | 2003051514 | A1 | 6/2003 |
| WO | 2003051934 | A2 | 6/2003 |
| WO | 2004085499 | A2 | 10/2004 |
| WO | 2005002744 | A1 | 1/2005 |
| WO | 2005092973 | A1 | 10/2005 |
| WO | 2007130553 | A2 | 11/2007 |
| WO | 2016005265 | A1 | 1/2016 |
| WO | 2018019925 | A1 | 2/2018 |
| WO | 2018064035 | A1 | 4/2018 |
| WO | 2019051006 | A1 | 3/2019 |
| WO | 2019070329 | A1 | 4/2019 |
| WO | 2019190898 | A1 | 10/2019 |

OTHER PUBLICATIONS

International Search Report and Written Opinion dated Nov. 5, 2021, pertaining to International Patent Application No. PCT/US2021/040645, 16 total pages.

Balke et al. "A Strategy for Interpreting Multidetector Size-Exclusion Chromatography Data II, Application in Plastic Waste Recovery", Chromatography Polymers, Chapter 13, 1992, pp. 198-219.

Kratochvil "Fundamental Light-Scattering Methods", Chapter 3, 1987, pp. 113-144.

Zimm "Apparatus and Methods for Measurement and Interpretation of the Angular Variation of Light Scattering; Preliminary Results on Polystyrene Solutions", Light Scattering in Polystyrene, 1948, pp. 1099-1116.

Chinese Office Action dated Mar. 18, 2025, pertaining to CN Patent Application No. 202180058844X, 19 pgs.

Japanese Office Action dated May 13, 2025, pertaining to JP Patent Application No. JP 2023-506282, 11 pgs.

Brazilian Technical Report dated Apr. 14, 2025, pertaining to BR Patent Application No. BR112023002145.6, 7 pgs.

US Notice of Allowance dated Nov. 21, 2025, pertaining to U.S. Appl. No. 18/040,546, 8 pgs.

Japanese Office Action dated Jun. 3, 2025, pertaining to JP Patent Application No. JP 2023-506167, 8 pgs.

US Non-Final Office Action dated Aug. 27, 2025, pertaining to U.S. Appl. No. 18/040,546, 10 pgs.

Korean Office Action dated Dec. 15, 2025, pertaining to KR Patent Application No. 10-2023-7007147, 18 pgs.

Chinese Office Action dated Jan. 10, 2026, pertaining to CN Patent Application No. 202180054834.9, 7 pgs.

Chinese Office Action dated Jan. 9, 2026, pertaining to CN Patent Application No. 202180058844.X, 19 pgs.

Korean Office Action dated Jan. 23, 2026, pertaining to KR Patent Application No. 10-2023-7007807, 18 pgs.

Japanese Notice of Reasons for Refusal dated Nov. 18, 2025, pertaining to JP Patent Application No. 2023-506282, 4 pgs.

Canadian Office Action dated May 8, 2026, pertaining to CA Patent Application 3187547, 5 pgs.

Canadian Office Action dated May 25, 2026, pertaining to CA Patent Application 3187544, 5 pgs.

India Examination Report dated May 21, 2026, pertaining to IN Patent Application No. 202317006239, 7 pgs.

India Examination Report dated Jun. 4, 2026, pertaining to IN Patent Application No. 202317006240, 10 pgs.

* cited by examiner

THERMOPLASTIC COMPOSITIONS COMPRISING RECYCLED POLYMERS AND ARTICLES MANUFACTURED THEREFROM

CROSS REFERENCE TO RELATED APPLICATIONS

This application claims priority to U.S. Provisional Patent Application No. 63/061,350, filed on Aug. 5, 2020, and International Patent Application No. PCT/US2021/040645, filed on Jul. 7, 2021, the entireties of both which are hereby incorporated by reference.

TECHNICAL FIELD

Embodiments of the present disclosure are generally directed to thermoplastic compositions and, in particular, thermoplastic compositions comprising recycled polymers and articles manufactured therefrom.

BACKGROUND

Thermoplastic compositions are commonly used to form coatings, such as insulation and jacket layers for wires and cables, and there is a growing interest regarding the sustainability of such compositions. One method of improving the sustainability of thermoplastic compositions is to utilize recycled polymers, such as post-consumer and/or pre-consumer recycled polymers. However, such recycled polymers often exhibit poor environmental stress-cracking resistance and mechanical properties, which makes them unsuitable to form coatings with long-term durability suitable for wire and cable applications. As such, recycled polymers may be mixed with virgin raw polymers in order to balance the environmental stress-cracking resistance, mechanical properties, and sustainability of the resulting thermoplastic composition; however, significant amounts of virgin raw polyethylene are typically required. Accordingly, there is an ongoing need to improve the sustainability of thermoplastic compositions by increasing the amounts of post-consumer recycled polymers included while also maintaining suitable environmental stress-cracking resistance and mechanical properties

SUMMARY

Embodiments of the present disclosure address these needs by providing a thermoplastic composition comprising from 0.5 wt. % to 75.0 wt. % of recycled polyethylene comprising a blend of polyethylene recovered from post-consumer material, pre-consumer material, or combinations thereof, and from 25.0 wt. % to 99.5 wt. % of virgin raw polyethylene comprising unimodal polyethylene, bimodal polyethylene, or combinations thereof, wherein at least 90.0 wt. % of the thermoplastic composition is comprised of the post-consumer recycled polyethylene and the virgin raw polyethylene. The recycled polyethylene has a density of from 0.920 g/cm$^3$ to 0.975 g/cm$^3$, a melt index ($I_2$) of from 0.30 dg/min to 3.00 dg/min, and a melt flow ratio ($MFR_{21}$) greater than or equal to 50. The unimodal polyethylene has a density of from 0.930 g/cm$^3$ to 0.950 g/cm$^3$, a melt index ($I_2$) of from 0.30 dg/min to 1.00 dg/min, and a melt flow ratio ($MFR_{21}$) greater than or equal to 30. The bimodal polyethylene has a density of from 0.933 g/cm$^3$ to 0.960 g/cm$^3$, a melt index ($I_2$) of from 0.30 dg/min to 2.00 dg/min, a melt flow ratio ($MFR_{21}$) greater than 80.0 dg/min, a molecular weight distribution ($M_w/M_n$) greater than 6, and a reverse short-chain branching distribution (SCBD).

These and additional features provided by the embodiments of the present disclosure will be more fully understood in view of the following detailed description, in conjunction with the drawing.

BRIEF DESCRIPTION OF THE DRAWING

The following detailed description can be best understood when read in conjunction with the drawing enclosed herewith, wherein.

Figure 1:
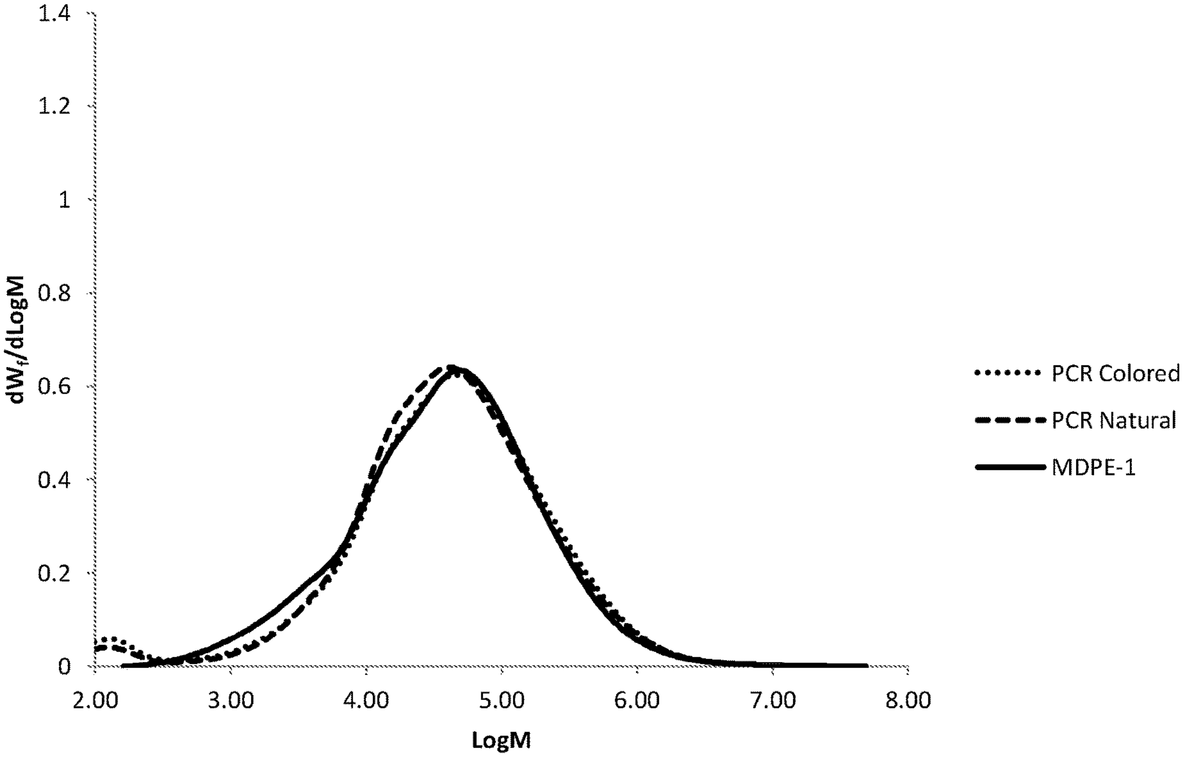
FIG. 1 graphically plots the molecular weight distributions of three polyethylene samples, according to one or more embodiments disclosed herein.

Reference will now be made in greater detail to various embodiments of the present disclosure, some of which are illustrated in the accompanying drawing.

DETAILED DESCRIPTION

Embodiments of the present disclosure are directed to thermoplastic compositions comprising recycled polymers and articles manufactured therefrom. In particular, embodiments of the present disclosure are directed to a thermoplastic composition comprising from 0.5 wt. % to 75.0 wt. % of recycled polyethylene comprising a blend of polyethylene recovered from post-consumer material, pre-consumer material, or combinations thereof, and from 25.0 wt. % to 99.5 wt. % of virgin raw polyethylene comprising unimodal polyethylene, bimodal polyethylene, or combinations thereof, wherein at least 90.0 wt. % of the thermoplastic composition is comprised of the post-consumer recycled polyethylene and the virgin raw polyethylene. The recycled polyethylene has a density of from 0.920 g/cm$^3$ to 0.975 g/cm$^3$, a melt index ($I_2$) of from 0.30 dg/min to 3.00 dg/min, and a melt flow ratio ($MFR_{21}$) greater than or equal to 50. The unimodal polyethylene has a density of from 0.930 g/cm$^3$ to 0.950 g/cm$^3$, a melt index ($I_2$) of from 0.30 dg/min to 1.00 dg/min, and a melt flow ratio ($MFR_{21}$) greater than or equal to 30. The bimodal polyethylene has a density of from 0.933 g/cm$^3$ to 0.960 g/cm$^3$, a melt index ($I_2$) of from 0.30 dg/min to 2.00 dg/min, a melt flow ratio ($MFR_{21}$) greater than 80.0 dg/min, a molecular weight distribution ($M_w/M_n$) greater than 6, and a reverse short-chain branching distribution (SCBD).

The term "polymer" refers to polymeric compounds prepared by polymerizing monomers, whether of the same or a different type. The generic term polymer thus includes homopolymers, which are polymers prepared by polymerizing only one monomer, and copolymers, which are polymers prepared by polymerizing two or more different monomers.

The term "interpolymer" refers to polymers prepared by polymerizing at least two different types of monomers. The generic term interpolymer thus includes copolymers and other polymers prepared by polymerizing more than two different monomers, such as terpolymers.

The terms "virgin raw polymer" and "primary raw polymer" refer to polymers that can be characterized as "primary (virgin) raw material," as defined by ISO 18604. The generic term virgin raw polymer thus includes polymers that have never been processed into any form of end-use product.

The term "post-consumer recycled polymer" refers to polymers, including blends of polymers, recovered from post-consumer material, as defined by ISO 14021. The generic term post-consumer recycled polymer thus includes blends of polymers recovered from materials generated by households or by commercial, industrial, and institutional facilities in their role as end-users of the material, which can no longer be used for its intended purpose. The generic term post-consumer recycled polymer also includes blends of polymers recovered from returns of materials from the distribution chain.

The terms "pre-consumer recycled polymer" and "post-industrial recycled polymer" refer to polymers, including blends of polymers, recovered from pre-consumer material, as defined by ISO 14021. The generic term pre-consumer recycled polymer thus includes blends of polymers recovered from materials diverted from the waste stream during a manufacturing process. The generic term pre-consumer recycled polymer excludes the reutilization of materials, such as rework, regrind, or scrap, generated in a process and capable of being reclaimed within the same process that generated it.

The term "unimodal polymer" refers to polymers that can be characterized by having only one fraction with a common density, weight average molecular weight, and, optionally, melt index value. Unimodal polymers can also be characterized by having only one distinct peak in a gel permeation chromatography (GPC) chromatogram depicting the molecular weight distribution of the composition.

The term "multimodal polymer" refers to polymers that can be characterized by having at least two fractions with varying densities, weight averaged molecular weights, and, optionally, melt index values. Multimodal polymers can also be characterized by having at least two distinct peaks in a gel permeation chromatography (GPC) chromatogram depicting the molecular weight distribution of the composition. The generic term multimodal polymer thus includes bimodal polymers, which have two primary fractions: a first fraction, which may be a low molecular weight fraction, and a second fraction, which may be a high molecular weight fraction.

The terms "polyolefin," "polyolefin polymer," and "polyolefin resin" refer to polymers prepared by polymerizing a simple olefin (also referred to as an alkene, which has the general formula $C_nH_{2n}$) monomer. The generic term polyolefin thus includes polymers prepared by polymerizing ethylene monomer with or without one or more comonomers, such as polyethylene, and polymers prepared by polymerizing propylene monomer with or without one or more comonomers, such as polypropylene.

The terms "polyethylene" and "ethylene-based polymer" refer to polyolefins comprising greater than 50 percent (%) by mole of units that have been derived from ethylene monomer, which includes polyethylene homopolymers and copolymers. Common forms of polyethylene known in the art include Low Density Polyethylene (LDPE), Linear Low Density Polyethylene (LLDPE), Ultra Low Density Polyethylene (ULDPE), Very Low Density Polyethylene (VLDPE), Medium Density Polyethylene (MDPE), and High Density Polyethylene (HDPE).

The term "melt flow ratio" refers to a ratio of melt and flow indices. The generic term melt flow ratio thus includes a melt flow ratio of a flow index ($I_{21}$) to a melt index ($I_2$), which may also be referred to as an "$MFR_{21}$."

The term "molecular weight distribution" refers to a ratio of molecular weights of a polymer. The generic term molecular weight distribution thus includes a ratio of a weight average molecular weight ($M_w$) of a polymer to a number average molecular weight ($M_n$) of the polymer, which may also be referred to as an "molecular weight distribution ($M_w/M_n$)," and a ratio of a z-average molecular weight ($M_z$) of a polymer to a weight average molecular weight ($M_w$) of the polymer, which may also be referred to as an "molecular weight distribution ($M_z/M_w$)."

The term "shear thinning index" refers to a ratio of complex viscosities of a polymer. The generic term shear thinning index thus includes a ratio of a complex viscosity of a polymer at a frequency of 0.1 radians per second (rad/s) to a ratio of a complex viscosity of the polymer at a frequency of 100 rad/s.

The term "composition" refers to a mixture of materials that comprises the composition, as well as reaction products and decomposition products formed from the materials of the composition.

The terms "comprising," "including," "having," and their derivatives, are not intended to exclude the presence of any additional component, step, or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed.

The thermoplastic composition may include recycled polyethylene. The recycled polyethylene may include polyethylene or a blend of polyethylene recovered from post-consumer material, pre-consumer material, or combinations thereof. In embodiments, the thermoplastic composition may include recycled polyethylene in an amount greater than or equal to 0.5 wt. %, such as greater than or equal to 5.0 wt. %, greater than or equal to 30.0 wt. %, greater than or equal to 45.0 wt. %, or greater than or equal to 50.0 wt. %, based on the total weight of the thermoplastic composition. The thermoplastic composition may also include recycled polyethylene in an amount less than or equal to 75.0 wt. %, such as less than or equal to 50.0 wt. %, less than or equal to 45.0 wt. %, less than or equal to 30.0 wt. %, or less than or equal to 5.0 wt. %, based on the total weight of the thermoplastic composition. For example, the thermoplastic composition may include recycled polyethylene in an amount of from 0.5 wt. % to 75.0 wt. %, from 0.5 wt. % to 50.0 wt. %, from 0.5 wt. % to 45.0 wt. %, from 0.5 wt. % to 30.0 wt. %, from 0.5 wt. % to 5.0 wt. %, from 5.0 wt. % to 75.0 wt. %, from 5.0 wt. % to 50.0 wt. %, from 5.0 wt. % to 45.0 wt. %, from 5.0 wt. % to 30.0 wt. %, from 30.0 wt. % to 75.0 wt. %, from 30.0 wt. % to 50.0 wt. %, from 30.0 wt. % to 45.0 wt. %, from 45.0 wt. % to 75.0 wt. %, from 45.0 wt. % to 50.0 wt. %, or from 50.0 wt. % to 75.0 wt. % based on the total weight of the thermoplastic composition.

In embodiments, the recycled polyethylene may have a density greater than or equal to 0.920 $g/cm^3$, such as greater than or equal to 0.931 $g/cm^3$, greater than or equal to 0.942 $g/cm^3$, greater than or equal to 0.950 $g/cm^3$, or greater than or equal to 0.965 $g/cm^3$. The recycled polyethylene may also have a density less than or equal to 0.975 $g/cm^3$, such as less than or equal to 0.965 $g/cm^3$, less than or equal to 0.950 $g/cm^3$, less than or equal to 0.942 $g/cm^3$, or less than or equal to 0.931 $g/cm^3$. For example, the recycled polyethylene may have a density of from 0.920 $g/cm^3$ to 0.975 $g/cm^3$, from 0.920 $g/cm^3$ to 0.965 $g/cm^3$, from 0.920 $g/cm^3$ to 0.950

$g/cm^3$, from 0.920 $g/cm^3$ to 0.942 $g/cm^3$, from 0.920 $g/cm^3$ to 0.931 $g/cm^3$, from 0.931 $g/cm^3$ to 0.975 $g/cm^3$, from 0.931 $g/cm^3$ to 0.965 $g/cm^3$, from 0.931 $g/cm^3$ to 0.950 $g/cm^3$, from 0.931 $g/cm^3$ to 0.942 $g/cm^3$, from 0.942 $g/cm^3$ to 0.975 $g/cm^3$, from 0.942 $g/cm^3$ to 0.965 $g/cm^3$, from 0.942 $g/cm^3$ to 0.950 $g/cm^3$, from 0.950 $g/cm^3$ to 0.975 $g/cm^3$, from 0.950 $g/cm^3$ to 0.965 $g/cm^3$, or from 0.965 $g/cm^3$ to 0.975 $g/cm^3$.

In embodiments, the recycled polyethylene may have a melt index ($I_2$) greater than or equal to 0.30 dg/min, such as greater than or equal to 0.75 dg/min, greater than or equal to 1.20 dg/min, greater than or equal to 1.65 dg/min, greater than or equal to 2.10 dg/min, or greater than or equal to 2.55 dg/min. The recycled polyethylene may also have a melt index ($I_2$) less than or equal to 3.00 dg/min, such as less than or equal to 2.55 dg/min, less than or equal to 2.10 dg/min, less than or equal to 1.65 dg/min, less than or equal to 1.20 dg/min, or less than or equal to 0.75 dg/min. For example, the recycled polyethylene may have a melt index ($I_2$) of from 0.30 dg/min to 3.00 dg/min, from 0.30 dg/min to 2.55 dg/min, from 0.30 dg/min to 2.10 dg/min, from 0.30 dg/min to 1.65 dg/min, from 0.30 dg/min to 1.20 dg/min, from 0.30 dg/min to 0.75 dg/min, from 0.75 dg/min to 3.00 dg/min, from 0.75 dg/min to 2.55 dg/min, from 0.75 dg/min to 2.10 dg/min, from 0.75 dg/min to 1.65 dg/min, from 0.75 dg/min to 1.20 dg/min, from 1.20 dg/min to 3.00 dg/min, from 1.20 dg/min to 2.55 dg/min, from 1.20 dg/min to 2.10 dg/min, from 1.20 dg/min to 1.65 dg/min, from 1.65 dg/min to 3.00 dg/min, from 1.65 dg/min to 2.55 dg/min, from 1.65 dg/min to 2.10 dg/min, from 2.10 dg/min to 3.00 dg/min, from 2.10 dg/min to 2.55 dg/min, or from 2.55 dg/min to 3.00 dg/min.

In embodiments, the recycled polyethylene may have a high load melt index ($I_{21}$) greater than or equal to 50 dg/min, such as greater than or equal to 55 dg/min, greater than or equal to 60 dg/min, greater than or equal to 65 dg/min, greater than or equal to 70 dg/min, or greater than or equal to 75 dg/min. The recycled polyethylene may also have a high load melt index ($I_{21}$) less than or equal to 80 dg/min, such as less than or equal to 75 dg/min, less than or equal to 70 dg/min, less than or equal to 65 dg/min, less than or equal to 60 dg/min, or less than or equal to 55 dg/min. For example, the recycled polyethylene may have a high load melt index ($I_{21}$) of from 50 dg/min to 80 dg/min, from 50 dg/min to 75 dg/min, from 50 dg/min to 70 dg/min, from 50 dg/min to 65 dg/min, from 50 dg/min to 60 dg/min, from 50 dg/min to 55 dg/min, from 55 dg/min to 80 dg/min, from 55 dg/min to 75 dg/min, from 55 dg/min to 70 dg/min, from 55 dg/min to 65 dg/min, from 55 dg/min to 60 dg/min, from 60 dg/min to 80 dg/min, from 60 dg/min to 75 dg/min, from 60 dg/min to 70 dg/min, from 60 dg/min to 65 dg/min, from 65 dg/min to 80 dg/min, from 65 dg/min to 75 dg/min, from 65 dg/min to 70 dg/min, from 70 dg/min to 80 dg/min, from 70 dg/min to 75 dg/min, or from 75 dg/min to 80 dg/min.

In embodiments, the recycled polyethylene may have a melt flow ratio ($MFR_{21}$) greater than or equal to 50, such as greater than or equal to 100, greater than or equal to 150, or greater than or equal to 200. In embodiments, the polyethylene may also have a melt flow ratio ($MFR_{21}$) less than or equal to 250, such as less than or equal to 200, less than or equal to 150, or less than or equal to 100. For example, the recycled polyethylene may also have a melt flow ratio ($MFR_{21}$) of from 50 to 250, from 50 to 200, from 50 to 150, from 50 to 100, from 100 to 250, from 100 to 200, from 100 to 150, from 150 to 250, from 150 to 200, or from 200 to 250. When the melt flow ratio ($MFR_{21}$) of the recycled polyethylene is less than, for example, 50, thermoplastic compositions including the recycled polyethylene may not have adequate processability to manufacture articles, such as, for example, insulation and jacket layers for wires and cables. Moreover, when the melt flow ratio ($MFR_{21}$) of the recycled polyethylene is less than, for example, 50, insulation and jacket layers including the recycled polyethylene may not have wire smoothness values necessary for some applications.

In embodiments, the recycled polyethylene may have a weight average molecular weight ($M_w$) greater than or equal to 100,000 g/mol, such as greater than or equal to 110,000 g/mol, greater than or equal to 120,000 g/mol, greater than or equal to 130,000 g/mol, or greater than or equal to 140,000 g/mol. The recycled polyethylene may also have a weight average molecular weight ($M_w$) less than or equal to 150,000 g/mol, such as less than or equal to 140,000 g/mol, less than or equal to 130,000 g/mol, less than or equal to 120,000 g/mol, or less than or equal to 110,000 g/mol. For example, the recycled polyethylene may have a weight average molecular weight ($M_w$) of from 100,000 g/mol to 150,000 g/mol, from 100,000 g/mol to 140,000 g/mol, from 100,000 g/mol to 130,000 g/mol, from 100,000 g/mol to 120,000 g/mol, from 100,000 g/mol to 110,000 g/mol, from 110,000 g/mol to 150,000 g/mol, from 110,000 g/mol to 140,000 g/mol, from 110,000 g/mol to 130,000 g/mol, from 110,000 g/mol to 120,000 g/mol, from 120,000 g/mol to 150,000 g/mol, from 120,000 g/mol to 140,000 g/mol, from 120,000 g/mol to 130,000 g/mol, from 130,000 g/mol to 150,000 g/mol, from 130,000 g/mol to 140,000 g/mol, or from 140,000 g/mol to 150,000 g/mol.

In embodiments, the recycled polyethylene may have a number average molecular weight ($M_n$) greater than or equal to 2,500 g/mol, such as greater than or equal to 3,000 g/mol, greater than or equal to 3,500 g/mol, greater than or equal to 4,000 g/mol, or greater than or equal to 4,500 g/mol. The recycled polyethylene may also have a number average molecular weight ($M_n$) less than or equal to 5,000 g/mol, such as less than or equal to 4,500 g/mol, less than or equal to 4,000 g/mol, less than or equal to 3,500 g/mol, or less than or equal to 3,000 g/mol. For example, the recycled polyethylene may have a number average molecular weight ($M_n$) of from 2,500 g/mol to 5,000 g/mol, from 2,500 g/mol to 4,500 g/mol, from 2,500 g/mol to 4,000 g/mol, from 2,500 g/mol to 3,500 g/mol, from 2,500 g/mol to 3,000 g/mol, from 3,000 g/mol to 5,000 g/mol, from 3,000 g/mol to 4,500 g/mol, from 3,000 g/mol to 4,000 g/mol, from 3,000 g/mol to 3,500 g/mol, from 3,500 g/mol to 5,000 g/mol, from 3,500 g/mol to 4,500 g/mol, from 3,500 g/mol to 4,000 g/mol, from 4,000 g/mol to 5,000 g/mol, from 4,000 g/mol to 4,500 g/mol, or from 4,500 g/mol to 5,000 g/mol.

In embodiments, the recycled polyethylene may have a z-average molecular weight ($M_z$) greater than or equal to 1,000,000 g/mol, such as greater than or equal to 1,250,000 g/mol, greater than or equal to 1,500,000 g/mol, or greater than or equal to 1,750,000 g/mol. The recycled polyethylene may also have a z-average molecular weight ($M_z$) less than or equal to 2,000,000 g/mol, such as less than or equal to 1,750,000 g/mol, less than or equal to 1,500,000 g/mol, or less than or equal to 1,250,000 g/mol. For example, the recycled polyethylene may have a z-average molecular weight ($M_z$) of from 1,000,000 g/mol to 2,000,000 g/mol, from 1,000,000 g/mol to 1,750,000 g/mol, from 1,000,000 g/mol to 1,500,000 g/mol, from 1,000,000 g/mol to 1,250,000 g/mol, from 1,250,000 g/mol to 2,000,000 g/mol, from 1,250,000 g/mol to 1,750,000 g/mol, from 1,250,000 g/mol to 1,500,000 g/mol, from 1,500,000 g/mol to 2,000,000 g/mol, from 1,500,000 g/mol to 1,750,000 g/mol, or from 1,750,000 g/mol to 2,000,000 g/mol.

In embodiments, the ratio of the weight average molecular weight ($M_w$) of the recycled polyethylene to the number average molecular weight ($M_n$) of the recycled polyethylene may be greater than or equal to 25, such as greater than or equal to 27, greater than or equal to 29, greater than or equal to 31, or greater than or equal to 33. The ratio of the weight average molecular weight ($M_w$) of the recycled polyethylene to the number average molecular weight ($M_n$) of the recycled polyethylene may also be less than or equal to 35, such as less than or equal to 33, less than or equal to 31, less than or equal to 29, or less than or equal to 27. For example, the ratio of the weight average molecular weight ($M_w$) of the recycled polyethylene to the number average molecular weight ($M_n$) of the recycled polyethylene may be from 25 to 35, from 25 to 33, from 25 to 31, from 25 to 29, from 25 to 27, from 27 to 35, from 27 to 33, from 27 to 31, from 27 to 29, from 29 to 35, from 29 to 33, from 29 to 31, from 31 to 35, from 31 to 33, or from 33 to 35. When the ratio of the weight average molecular weight ($M_w$) of the recycled polyethylene to the number average molecular weight ($M_n$) of the recycled polyethylene is less than, for example, 25, thermoplastic compositions including the recycled polyethylene may not have adequate processability to manufacture articles, such as, for example, insulation and jacket layers for wires and cables. Moreover, when the ratio of the weight average molecular weight ($M_w$) of the recycled polyethylene to the number average molecular weight ($M_n$) of the recycled polyethylene is less than, for example, 25, insulation and jacket layers including the recycled polyethylene may not have wire smoothness values necessary for some applications.

In embodiments, the ratio of the z-average molecular weight ($M_z$) of the p recycled polyethylene to the weight average molecular weight ($M_w$) of the recycled polyethylene may be greater than or equal to 10, such as greater than or equal to 11, greater than or equal to 12, greater than or equal to 13, or greater than or equal to 14. The ratio of the z-average molecular weight ($M_z$) of the recycled polyethylene to the weight average molecular weight ($M_w$) of the recycled polyethylene may also be less than or equal to 15, such as less than or equal to 14, less than or equal to 13, less than or equal to 12, or less than or equal to 11. For example, the ratio of the z-average molecular weight ($M_z$) of the recycled polyethylene to the weight average molecular weight ($M_w$) of the recycled polyethylene may be from 10 to 15, from 10 to 14, from 10 to 13, from 10 to 12, from 10 to 11, from 11 to 15, from 11 to 14, from 11 to 13, from 11 to 12, from 12 to 15, from 12 to 14, from 12 to 13, from 13 to 15, from 13 to 14, or from 14 to 15.

In embodiments, the recycled polyethylene may have a melting point ($T_m$) greater than or equal to 105° C., such as greater than or equal to 110° C., greater than or equal to 115° C., greater than or equal to 120° C., greater than or equal to 125° C., or greater than or equal to 130° C. The recycled polyethylene may also have a melting point ($T_m$) less than or equal to 135° C., such as less than or equal to 130° C., less than or equal to 125° C., less than or equal to 120° C., less than or equal to 115° C., or less than or equal to 110° C. For example, the post-consumer recycled polyethylene may also have a melting point ($T_m$) of from 105° C. to 135° C., from 105° C. to 130° C., from 105° C. to 125° C., from 105° C. to 120° C., from 105° C. to 115° C., from 105° C. to 110° C., from 110° C. to 135° C., from 110° C. to 130° C., from 110° C. to 125° C., from 110° C. to 120° C., from 110° C. to 115° C., from 115° C. to 135° C., from 115° C. to 130° C., from 115° C. to 125° C., from 115° C. to 120° C., from 120° C. to 135° C., from 120° C. to 130° C., from 120° C. to 125° C., from 125° C. to 135° C., from 125° C. to 130° C., or from 130° C. to 135° C.

The thermoplastic composition may also include virgin raw polyethylene that has never been processed into any form of end-use product. Virgin raw polyethylene may include unimodal polyethylene, bimodal polyethylene, or combinations thereof. In embodiments, the thermoplastic composition may include virgin raw polyethylene in an amount greater than or equal to 25.0 wt. %, such as greater than or equal to 45.0 wt. %, greater than or equal to 55.0 wt. %, greater than or equal to 70.0 wt. %, or greater than or equal to 95.0 wt. %, based on the total weight of the thermoplastic composition. The thermoplastic composition may also include virgin raw polyethylene in an amount less than or equal to 99.5 wt. %, such as less than or equal to 95.0 wt. %, less than or equal to 70.0 wt. %, less than or equal to 55.0 wt. %, or less than or equal to 45.0 wt. %, based on the total weight of the thermoplastic composition. For example, the thermoplastic composition may include virgin raw polyethylene in an amount of from 25.0 wt. % to 99.5 wt. %, from 25.0 wt. % to 95.0 wt. %, from 25.0 wt. % to 70.0 wt. %, from 25.0 wt. % to 55.0 wt. %, from 25.0 wt. % to 45.0 wt. %, from 45.0 wt. % to 99.5 wt. %, from 45.0 wt. % to 95.0 wt. %, from 45.0 wt. % to 70.0 wt. %, from 45.0 wt. % to 55.0 wt. %, from 55.0 wt. % to 99.5 wt. %, from 55.0 wt. % to 95.0 wt. %, from 55.0 wt. % to 70.0 wt. %, from 70.0 wt. % to 99.5 wt. %, from 70.0 wt. % to 95.0 wt. %, or from 95.0 wt. % to 99.5 wt. % based on the total weight of the thermoplastic composition.

As noted hereinabove, the virgin raw polyethylene may comprise unimodal polyethylene. The unimodal polyethylene may be made by a gas-phase, solution-phase, or slurry polymerization processes, or any combination thereof, using any type of reactor or reactor configuration known in the art (e.g., fluidized bed gas phase reactors, loop reactors, stirred tank reactors, batch reactors in parallel, series, and/or any combinations thereof). The catalysts used to make the unimodal polyethylene described herein may include Ziegler-Natta, metallocene, constrained geometry, single site catalysts, or chromium-based catalysts.

In embodiments, the unimodal polyethylene may have a density greater than or equal to 0.930 g/cm$^3$, such as greater than or equal to 0.934 g/cm$^3$, greater than or equal to 0.938 g/cm$^3$, greater than or equal to 0.942 g/cm$^3$, or greater than or equal to 0.946 g/cm$^3$. The unimodal polyethylene may also have a density less than or equal to 0.950 g/cm$^3$, such as less than or equal to 0.946 g/cm$^3$, less than or equal to 0.942 g/cm$^3$, less than or equal to 0.938 g/cm$^3$, or less than or equal to 0.934 g/cm$^3$. For example, the unimodal polyethylene may have a density of from 0.930 g/cm$^3$ to 0.950 g/cm$^3$, from 0.930 g/cm$^3$ to 0.946 g/cm$^3$, from 0.930 g/cm$^3$ to 0.942 g/cm$^3$, from 0.930 g/cm$^3$ to 0.938 g/cm$^3$, from 0.930 g/cm$^3$ to 0.934 g/cm$^3$, from 0.934 g/cm$^3$ to 0.950 g/cm$^3$, from 0.934 g/cm$^3$ to 0.946 g/cm$^3$, from 0.934 g/cm$^3$ to 0.942 g/cm$^3$, from 0.934 g/cm$^3$ to 0.938 g/cm$^3$, from 0.938 g/cm$^3$ to 0.950 g/cm$^3$, from 0.938 g/cm$^3$ to 0.946 g/cm$^3$, from 0.938 g/cm$^3$ to 0.942 g/cm$^3$, from 0.942 g/cm$^3$ to 0.950 g/cm$^3$, from 0.942 g/cm$^3$ to 0.946 g/cm$^3$, or from 0.9460 g/cm$^3$ to 0.950 g/cm$^3$.

In embodiments, the unimodal polyethylene may have a melt index ($I_2$) greater than or equal to 0.50 dg/min, such as greater than or equal to 0.60 dg/min, greater than or equal to 0.70 dg/min, greater than or equal to 0.80 dg/min, or greater than or equal to 0.90 dg/min. The unimodal polyethylene may also have a melt index ($I_2$) less than or equal to 1.00 dg/min, such as less than or equal to 0.90 dg/min, less than or equal to 0.80 dg/min, less than or equal to 0.70 dg/min, or less than or equal to 0.60 dg/min. For example, the unimodal polyethylene may have a melt index ($I_2$) of from 0.50 dg/min to 1.00 dg/min, from 0.50 dg/min to 0.90 dg/min, from 0.50 dg/min to 0.80 dg/min, from 0.50 dg/min to 0.70 dg/min, from 0.50 dg/min to 0.60 dg/min, from 0.60 dg/min to 1.00 dg/min, from 0.60 dg/min to 0.90 dg/min, from 0.60 dg/min to 0.80 dg/min, from 0.60 dg/min to 0.70 dg/min, from 0.70 dg/min to 1.00 dg/min, from 0.70 dg/min to 0.90 dg/min, from 0.70 dg/min to 0.80 dg/min, from 0.80 dg/min to 1.00 dg/min, from 0.80 dg/min to 0.90 dg/min, or from 0.90 dg/min to 1.00 dg/min.

In embodiments, the unimodal polyethylene may have a high load melt index ($I_{21}$) greater than or equal to 30 dg/min, such as greater than or equal to 40 dg/min, greater than or equal to 50 dg/min, greater than or equal to 60 dg/min, or greater than or equal to 70 dg/min. The unimodal polyethylene may also have a high load melt index ($I_{21}$) less than or equal to 80 dg/min, such as less than or equal to 70 dg/min, less than or equal to 60 dg/min, less than or equal to 50 dg/min, or less than or equal to 40 dg/min. For example, the unimodal polyethylene may have a high load melt index ($I_{21}$) of from 30 dg/min to 80 dg/min, from 30 dg/min to 70 dg/min, from 30 dg/min to 60 dg/min, from 30 dg/min to 50 dg/min, from 30 dg/min to 40 dg/min, from 40 dg/min to 80 dg/min, from 40 dg/min to 70 dg/min, from 40 dg/min to 60 dg/min, from 40 dg/min to 50 dg/min, from 50 dg/min to 80 dg/min, from 50 dg/min to 70 dg/min, from 50 dg/min to 60 dg/min, from 60 dg/min to 80 dg/min, from 60 dg/min to 70 dg/min, or from 70 dg/min to 80 dg/min.

In embodiments, the unimodal polyethylene may have a melt flow ratio ($MFR_{21}$) greater than or equal to 30, such as greater than or equal to 74, greater than or equal to 118, greater than or equal to 162, or greater than or equal to 206. In embodiments, the unimodal polyethylene may also have a melt flow ratio ($MFR_{21}$) less than or equal to 250, such as less than or equal to 206, less than or equal to 162, less than or equal to 118, or less than or equal to 74. For example, the unimodal polyethylene may also have a melt flow ratio ($MFR_{21}$) of from 30 to 250, from 20 to 206, from 30 to 162, from 30 to 118, from 30 to 74, from 74 to 250, from 74 to 206, from 74 to 162, from 74 to 118, from 118 to 250, from 118 to 206, from 118 to 162 from 162 to 250, from 162 to 206, or from 206 to 250. When the melt flow ratio ($MFR_{21}$) of the unimodal polyethylene is less than, for example, 30, thermoplastic compositions including the unimodal polyethylene may not have adequate processability to manufacture articles, such as, for example, insulation and jacket layers for wires and cables. Moreover, when the melt flow ratio ($MFR_{21}$) of the unimodal polyethylene is less than, for example, 30, insulation and jacket layers including the unimodal polyethylene may not have wire smoothness values necessary for some applications.

In embodiments, the unimodal polyethylene may have a weight average molecular weight ($M_w$) greater than or equal to 100,000 g/mol, such as greater than or equal to 110,000 g/mol, greater than or equal to 120,000 g/mol, greater than or equal to 130,000 g/mol, or greater than or equal to 140,000 g/mol. The unimodal polyethylene may also have a weight average molecular weight ($M_w$) less than or equal to 150,000 g/mol, such as less than or equal to 140,000 g/mol, less than or equal to 130,000 g/mol, less than or equal to 120,000 g/mol, or less than or equal to 110,000 g/mol. For example, the unimodal polyethylene may have a weight average molecular weight ($M_w$) of from 100,000 g/mol to 150,000 g/mol, from 100,000 g/mol to 140,000 g/mol, from 100,000 g/mol to 130,000 g/mol, from 100,000 g/mol to 120,000 g/mol, from 100,000 g/mol to 110,000 g/mol, from 110,000 g/mol to 150,000 g/mol, from 110,000 g/mol to 140,000 g/mol, from 110,000 g/mol to 130,000 g/mol, from 110,000 g/mol to 120,000 g/mol, from 120,000 g/mol to 150,000 g/mol, from 120,000 g/mol to 140,000 g/mol, from 120,000 g/mol to 130,000 g/mol, from 130,000 g/mol to 150,000 g/mol, from 130,000 g/mol to 140,000 g/mol, or from 140,000 g/mol to 150,000 g/mol.

In embodiments, the unimodal polyethylene may have a number average molecular weight ($M_n$) greater than or equal to 5,000 g/mol, such as greater than or equal to 7,000 g/mol, greater than or equal to 9,000 g/mol, greater than or equal to 11,000 g/mol, or greater than or equal to 13,000 g/mol. The unimodal polyethylene may also have a number average molecular weight ($M_n$) less than or equal to 15,000 g/mol, such as less than or equal to 13,000 g/mol, less than or equal to 11,000 g/mol, less than or equal to 9,000 g/mol, or less than or equal to 7,000 g/mol. For example, the unimodal polyethylene may have a number average molecular weight ($M_n$) of from 5,000 g/mol to 15,000 g/mol, from 5,000 g/mol to 13,000 g/mol, from 5,000 g/mol to 11,000 g/mol, from 5,000 g/mol to 9,000 g/mol, from 5,000 g/mol to 7,000 g/mol, from 7,000 g/mol to 15,000 g/mol, from 7,000 g/mol to 13,000 g/mol, from 7,000 g/mol to 11,000 g/mol, from 7,000 g/mol to 9,000 g/mol, from 9,000 g/mol to 15,000 g/mol, from 9,000 g/mol to 13,000 g/mol, from 9,000 g/mol to 11,000 g/mol, from 11,000 g/mol to 15,000 g/mol, from 411000 g/mol to 13,000 g/mol, or from 13,000 g/mol to 15,000 g/mol.

In embodiments, the unimodal polyethylene may have a z-average molecular weight ($M_z$) greater than or equal to 1,000,000 g/mol, such as greater than or equal to 1,500,000 g/mol, greater than or equal to 2,000,000 g/mol, or greater than or equal to 2,500,000 g/mol. The unimodal polyethylene may also have a z-average molecular weight ($M_z$) less than or equal to 3,000,000 g/mol, such as less than or equal to 2,500,000 g/mol, less than or equal to 2,000,000 g/mol, or less than or equal to 1,500,000 g/mol. For example, the unimodal polyethylene may have a z-average molecular weight ($M_z$) of from 1,00,000 g/mol to 3,000,000 g/mol, from 1,00,000 g/mol to 2,500,000 g/mol, from 1,000,000 g/mol to 2,000,000 g/mol, from 1,000,000 g/mol to 1,500,000 g/mol, from 1,500,000 g/mol to 3,000,000 g/mol, from 1,500,000 g/mol to 2,500,000 g/mol, from 1,500,000 g/mol to 2,000,000 g/mol, from 2,000,000 g/mol to 3,000,000 g/mol, from 2,000,000 g/mol to 2,500,000 g/mol, or from 2,500,000 g/mol to 3,000,000 g/mol.

In embodiments, the ratio of the weight average molecular weight ($M_w$) of the unimodal polyethylene to the number average molecular weight ($M_n$) of the unimodal polyethylene may be greater than or equal to 10, such as greater than or equal to 12, greater than or equal to 14, greater than or equal to 16, or greater than or equal to 18. The ratio of the weight average molecular weight ($M_w$) of the unimodal polyethylene to the number average molecular weight ($M_n$) of the unimodal polyethylene may also be less than or equal to 20, such as less than or equal to 18, less than or equal to 16, less than or equal to 14, or less than or equal to 12. For example, the ratio of the weight average molecular weight ($M_w$) of the unimodal polyethylene to the number average molecular weight ($M_n$) of the unimodal polyethylene may be from 10 to 20, from 10 to 18, from 10 to 16, from 10 to 14, from 10 to 12, from 12 to 20, from 12 to 18, from 12 to 16, from 12 to 14, from 14 to 20, from 14 to 18, from 14 to 16, from 16 to 20, from 16 to 18, or from 18 to 20. When the ratio of the weight average molecular weight ($M_w$) of the unimodal polyethylene to the number average molecular weight ($M_n$) of the unimodal polyethylene is less than, for example, 10, thermoplastic compositions including the unimodal polyethylene may not have adequate processability to manufacture articles, such as, for example, insulation and jacket layers for wires and cables. Moreover, when the ratio of the weight average molecular weight ($M_w$) of the unimodal polyethylene to the number average molecular weight ($M_n$) of the unimodal polyethylene is less than, for example, 10, insulation and jacket layers including the unimodal polyethylene may not have wire smoothness values necessary for some applications.

In embodiments, the ratio of the z-average molecular weight ($M_z$) of the unimodal polyethylene to the weight average molecular weight ($M_w$) of the unimodal polyethylene may be greater than or equal to 10, such as greater than or equal to 13, greater than or equal to 16, greater than or equal to 19, or greater than or equal to 22. The ratio of the z-average molecular weight ($M_z$) of the unimodal polyethylene to the weight average molecular weight ($M_w$) of the unimodal polyethylene may also be less than or equal to 25, such as less than or equal to 22, less than or equal to 19, less than or equal to 16, or less than or equal to 13. For example, the ratio of the z-average molecular weight ($M_z$) of the unimodal polyethylene to the weight average molecular weight ($M_w$) of the unimodal polyethylene may be from 10 to 25, from 10 to 22, from 10 to 19, from 10 to 16, from 10 to 13, from 13 to 25, from 13 to 22, from 13 to 19, from 13 to 16, from 16 to 25, from 16 to 22, from 16 to 19, from 19 to 25, from 19 to 22, or from 22 to 25.

In embodiments, the unimodal polyethylene may have a melting point ($T_m$) greater than or equal to 120° C., such as greater than or equal to 122° C., greater than or equal to 124° C., or greater than or equal to 126° C. In embodiments, the unimodal polyethylene may also have a melting point ($T_m$) less than or equal to 130° C., such as less than or equal to 128° C., less than or equal to 126° C., or less than or equal to 124° C. For example, the unimodal polyethylene may also have a melting point ($T_m$) of from 120° C. to 130° C., from 120° C. to 128° C., from 120° C. to 126° C., from 120° C. to 124° C., from 120° C. to 122° C., from 122° C. to 130° C., from 122° C. to 128° C., from 122° C. to 126° C., from 122° C. to 124° C., or from 124° C. to 126° C.

As noted hereinabove, the virgin raw polyethylene may include bimodal polyethylene. In embodiments, the bimodal polyethylene may be a polymerized reaction product of an ethylene monomer and at least one $C_3$-$C_{12}$ α-olefin comonomer. For example, embodiments of the bimodal polyethylene composition may be a polymerized reaction product of an ethylene monomer and 1-butene, 1-hexene, or both. Alternatively, embodiments of the bimodal polyethylene composition may be a polymerized reaction product of an ethylene monomer and 1-butene, 1-octene, or both. Embodiments of the bimodal polyethylene may also be a polymerized reaction product of an ethylene monomer and 1-hexene, 1-octene, or both. In some embodiments, the $C_3$-$C_{12}$ α-olefin comonomer may not be propylene. That is, the at least one $C_3$-$C_{12}$ α-olefin comonomer may be substantially free of propylene. The term "substantially free" of a compound means the material or mixture comprises less than 1.0 wt. % of the compound. For example, the at least one $C_3$-$C_{12}$ α-olefin comonomer, which may be substantially free of propylene, may comprise less than 1.0 wt. % propylene, such as less than 0.8 wt. % propylene, less than 0.6 wt. % propylene, less than 0.4 wt. % propylene, or less than 0.2 wt. % propylene.

In embodiments, the bimodal polyethylene may be produced with a catalyst system in a single reactor. As used herein, a "catalyst system" may comprise a main catalyst, a trim catalyst, and, optionally, at least one activator. Catalyst systems may also include other components, such as supports, and are not limited to a main catalyst, a trim catalyst, and, optionally, at least one activator. Embodiments of the catalyst system may comprise a main catalyst and a metallocene trim catalyst. Embodiments of the catalyst system may also comprise one or more additives commonly used in the art of olefin polymerization. For example, embodiments of the catalyst system may comprise one or more continuity additives, flow aids, and anti-static aids. In embodiments, the reactor may be a gas phase reactor, although slurry phase reactors may also be used.

Embodiments of the catalyst system may comprise at least one catalyst for producing a high molecular weight fraction of the bimodal polyethylene by polymerization (sometimes referred to herein as an "HMW catalyst"), and at least one catalyst compound for producing a low molecular weight fraction of the bimodal polyethylene by polymerization (sometimes referred to herein as an "LMW catalyst").

The HMW catalyst and the LMW catalyst may have different hydrogen responses. That is, the change in average molecular weight of a polyethylene made by each of the catalysts may be different when the molar ratio of hydrogen gas to ethylene ($H_2/C_2$ molar ratio) is changed. The term "high hydrogen response" refers to a catalyst that displays a relatively large change in the average molecular weight of a polyethylene when the $H_2/C_2$ molar ratio is changed by a set amount. The term "low hydrogen response" refers to a catalyst that displays a relatively low change in average molecular weight of polyethylene when the $H_2/C_2$ molar ratio is changed by the same set amount.

The HMW catalyst and the LMW catalyst may have different comonomer responses. That is, the comonomer content, such as weight percent, of a polyethylene made by each of the catalyst compounds may be different. The term "good incorporator" refers to a catalyst that displays a relatively high degree of comonomer incorporation, while a "poor incorporator" enchains relatively less comonomer. For catalyst systems employing a relatively good incorporator HMW catalyst and a relatively poor incorporator LMW catalyst, a "reverse comonomer distribution" is produced with higher comonomer content in the HMW component. Conversely, a good incorporator LMW catalyst used with a poor incorporator HMW catalyst produces a "normal comonomer distribution."

Embodiments of the catalyst system may be referred to as a "bimodal catalyst system." Such a catalyst system produces a bimodal polyethylene composition having separate, identifiable high molecular weight and low molecular weight distributions. The term "bimodal catalyst system" may comprise any formulation, mixture, or system that comprises at least two different catalyst compounds, each having the same or a different metal group, but generally different ligands or catalyst structure, including a "dual catalyst." Alternatively, each different catalyst compound of the bimodal catalyst system resides on a single support particle, in which case a dual catalyst is considered to be a supported catalyst. However, the term "bimodal catalyst system" also broadly comprises a system or mixture in which one of the catalysts resides on one collection of support particles, and another catalyst resides on another collection of support particles. In such embodiments, the two supported catalysts are introduced to a single reactor, either simultaneously or sequentially, and polymerization is conducted in the presence of the two collections of supported catalysts. Alternatively, the bimodal catalyst system may comprise a mixture of unsupported catalysts in slurry form.

Embodiments of the catalyst system may comprise a main catalyst and a trim catalyst. In such embodiments, the main catalyst comprises at least one catalyst compound (the "main catalyst compound") and a support, and may also comprise an activator, and/or any other additives such as previously described. The main catalyst may be delivered as a slurry in a hydrocarbon diluent, such as mineral oil. The trim catalyst comprises a trim catalyst compound. This trim catalyst compound may also be present in the main catalyst system. The trim catalyst may also comprise a solvent, such as a hydrocarbon, as well as other additives.

Embodiments of the trim catalyst compound may comprise a molecular catalyst compound, such as, for example, a metallocene catalyst compound. In some embodiments, the trim catalyst may be employed for producing a low molecular weight polymer fraction. In such embodiments, the main catalyst may be employed for producing a high molecular weight polymer fraction.

Embodiments of the main catalyst compound may comprise one or more Group 15 metal containing catalyst compounds. The Group 15 metal containing compound may generally comprise a Group 3 to 14 metal atom, or a Group 3 to 7, or a Group 4 to 6, or a Group 4 metal atom bound to at least one leaving group and at least two Group 15 atoms, at least one of which is also bound to a Group 15 or 16 atom through another group. At least one of the Group 15 atoms may be bound to a Group 15 or 16 atom through another group which may be a $C_1$ to $C_{20}$ hydrocarbon group, a heteroatom containing group, silicon, germanium, tin, lead, or phosphorus, wherein the Group 15 or 16 atom may also be bound to nothing or a hydrogen, a Group 14 atom containing group, a halogen, or a heteroatom containing group, and wherein each of the two Group 15 atoms are also bound to a cyclic group and may optionally be bound to hydrogen, a halogen, a heteroatom or a hydrocarbyl group, or a heteroatom containing group.

The Group 15 metal containing compound may be represented by the formulae:

Formula 1

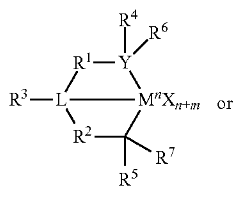

or

Formula 2

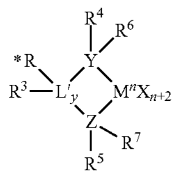

wherein M is a Group 3 to 12 transition metal or a Group 13 or 14 main group metal, or a Group 4, 5, or 6 metal, or a Group 4 metal, or zirconium, titanium or hafnium, and each X is independently a leaving group. X may be an anionic leaving group. X may be hydrogen, a hydrocarbyl group, a heteroatom or a halogen. X may be an alkyl, y may be 0 or 1 (when y is 0 group L' is absent), n is the oxidation state of M, which may be +3, +4, or +5, or may be +4, m is the formal charge of the YZL or the YZL' ligand, which may be 0, −1, −2 or −3, or may be −2, L is a Group 15 or 16 element, preferably nitrogen, L' is a Group 15 or 16 element or Group 14 containing group, preferably carbon, silicon or germanium, Y is a Group 15 element, preferably nitrogen or phosphorus, and more preferably nitrogen, Z is a Group 15 element, preferably nitrogen or phosphorus, and more preferably nitrogen, $R^1$ and $R^2$ are independently a $C_1$ to $C_{20}$ hydrocarbon group, a heteroatom containing group having up to twenty carbon atoms, silicon, germanium, tin, lead, halogen or phosphorus, preferably a $C_2$ to $C_{20}$ alkyl, aryl or aralkyl group, more preferably a linear, branched or cyclic $C_2$ to $C_{20}$ alkyl group, most preferably a $C_2$ to $C_6$ hydrocarbon group. $R^1$ and $R^2$ may also be interconnected to each other, $R^3$ is absent or a hydrocarbon group, hydrogen, a halogen, a heteroatom containing group, preferably a linear, cyclic or branched alkyl group having 1 to 20 carbon atoms, more preferably $R^3$ is absent, hydrogen or an alkyl group, and most preferably hydrogen, $R^4$ and $R^5$ are independently an alkyl group, an aryl group, substituted aryl group, a cyclic alkyl group, a substituted cyclic alkyl group, a cyclic aralkyl group, a substituted cyclic aralkyl group or multiple ring system, preferably having up to 20 carbon atoms, more preferably between 3 and 10 carbon atoms, and even more preferably a $C_1$ to $C_{20}$ hydrocarbon group, a $C_1$ to $C_{20}$ aryl group or a $C_1$ to $C_{20}$ aralkyl group, or a heteroatom-containing group, for example $PR_3$ where R is an alkyl group, $R^1$ and $R^2$ may be interconnected to each other, and/or $R^4$ and $R^5$ may be interconnected to each other, $R^6$ and $R^7$ are independently absent, or hydrogen, an alkyl group, halogen, heteroatom or a hydrocarbyl group, preferably a linear, cyclic or branched alkyl group having 1 to 20 carbon atoms, more preferably absent, and *R is absent, or is hydrogen, a Group 14 atom containing group, a halogen, or a heteroatom containing group.

By "formal charge of the YZL or YZL' ligand," it is meant the charge of the entire ligand absent the metal and the leaving groups X.

By "$R^1$ and $R^2$ may also be interconnected," it is meant that $R^1$ and $R^2$ may be directly bound to each other or may be bound to each other through other groups. By "$R^4$ and $R^5$ may also be interconnected," it is meant that $R^4$ and $R^5$ may be directly bound to each other or may be bound to each other through other groups.

Alkyl groups may be linear or branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbamoyl radicals, alkyl- or dialkyl-carbamoyl radicals, acyloxy radicals, acylamino radicals, aroylamino radicals, straight, branched or cyclic, alkylene radicals, or combination thereof. An aralkyl group is defined to be a substituted aryl group.

$R^4$ and $R^5$ may be independently a group represented by the following Formula 3:

Formula 3

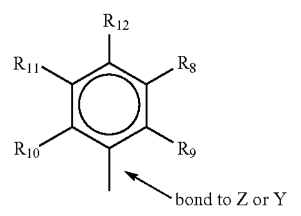

wherein $R^8$ to $R^{12}$ are each independently hydrogen, a $C_1$ to $C_{40}$ alkyl group, a halide, a heteroatom, a heteroatom containing group containing up to 40 carbon atoms, preferably a $C_1$ to $C_{20}$ linear or branched alkyl group, preferably a methyl, ethyl, propyl or butyl group, any two R groups may form a cyclic group and/or a heterocyclic group. The cyclic groups may be aromatic. $R^9$, $R^{10}$, and $R^{12}$ may be independently a methyl, ethyl, propyl or butyl group (including all isomers). In a preferred embodiment any 3 of the R groups of Formula 3 may be methyl groups, and any 2 of the other R groups of Formula 3 may be hydrogen. In a preferred embodiment of the invention, $R^9$, $R^{10}$, and $R^{12}$ are methyl, and $R^8$ and $R^{11}$ are hydrogen.

$R^4$ and $R^5$ may be both a group represented by the following Formula 4:

Formula 4

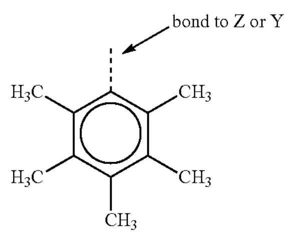

where M is a Group 4 metal, preferably zirconium, titanium or hafnium, and even more preferably zirconium; each of L, Y, and Z is nitrogen; each of $R^1$ and $R^2$ is $—CH_2—CH_2—$; $R^3$ is hydrogen; and $R^6$ and $R^7$ are absent.

The Group 15 and metal containing compound may be Compound I (also referred to as "bis(arylamido)Zr dibenzyl" represented below:

Compound 1

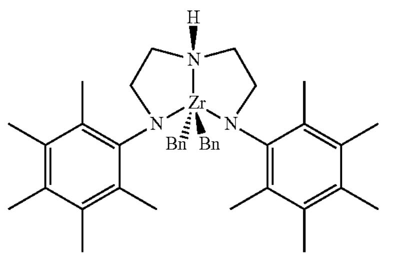

In the representation of Compound 1, "Bn" denotes a benzyl group.

Group 15 and metal containing catalyst compounds may be made by methods known in the art. In some cases, the methods disclosed in European Patent Application Publication No. EP 0 893 454 A1, U.S. Pat. No. 5,889,128 and the references cited in U.S. Pat. No. 5,889,128 are suitable.

In some embodiments, direct synthesis of these compounds includes reacting the neutral ligand, (for example YZL or YZL' of Formula 1 or 2) with $M''X_n$ (M is a Group 3 to 14 metal, n is the oxidation state of M, each X is an anionic group, such as halide), in a non-coordinating or weakly coordinating solvent (such as ether, toluene, xylene, benzene, methylene chloride, and/or hexane or other solvent having a boiling point above 60° C.), at 20 to 150° C. (such as 20 to 100° C.), for 24 hours or more, then treating the mixture with an excess (such as four or more equivalents) of an alkylating agent, such as methyl magnesium bromide in ether. The magnesium salts are removed by filtration, and the metal complex isolated by standard techniques.

The Group 15 and metal containing compound may be made by a method comprising reacting a neutral ligand (for example YZL or YZL' of Formula 1 or 2) with a compound represented by the formula $M''X_n$ (where M is a Group 3 to 14 metal, n is the oxidation state of M, and each X is an anionic leaving group) in a non-coordinating or weakly coordinating solvent, at 20° C. or above (preferably at 20 to 100° C.), then treating the mixture with an excess of an alkylating agent, then recovering the metal complex. The solvent may have a boiling point above 60° C., such as toluene, xylene, benzene, and/or hexane. The solvent may comprise ether and/or methylene chloride.

Generally, metallocene compounds may include half and full sandwich compounds having one or more ligands bonded to at least one metal atom. Typical metallocene compounds are generally described as containing one or more ligand(s) and one or more leaving group(s) bonded to at least one metal atom.

The ligands are generally represented by one or more open, acyclic, or fused ring(s) or ring system(s) or a combination thereof. These ligands, preferably the ring(s) or ring system(s) may be composed of atoms selected from Groups 13 to 16 atoms of the Periodic Table of Elements. The atoms may be selected from the group consisting of carbon, nitrogen, oxygen, silicon, sulfur, phosphorous, germanium, boron and aluminum or a combination thereof. The ring(s) or ring system(s) may be composed of carbon atoms such as but not limited to those cyclopentadienyl ligands or cyclopentadienyl-type ligand structures or other similar functioning ligand structure such as a pentadiene, a cyclooctatetraendiyl or an imide ligand. The metal atom may be selected from Groups 3 through 15 and the lanthanide or actinide series of the Periodic Table of Elements. The metal may be a transition metal from Groups 4 through 12, or Groups 4, 5 and 6, or the transition metal is from Group 4.

The catalyst composition may include one or more metallocene catalyst compounds represented by the Formula 5:

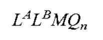

$$L^AL^BMQ_n \quad \text{Formula 5}$$

where M is a metal atom from the Periodic Table of the Elements and may be a Group 3 to 12 metal or from the lanthanide or actinide series of the Periodic Table of Elements. M may be a Group 4, 5 or 6 transition metal, or M is a Group 4 transition metal, or M is zirconium, hafnium or titanium. The ligands, $L^A$ and $L^B$, may be open, acyclic or fused ring(s) or ring system(s) and may be any ancillary ligand system, including unsubstituted or substituted, cyclopentadienyl ligands or cyclopentadienyl-type ligands, heteroatom substituted and/or heteroatom containing cyclopentadienyl-type ligands. Non-limiting examples of ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine (WO 99/40125), pyrrolyl ligands, pyrozolyl ligands, carbazolyl ligands, borabenzene ligands and the like, including hydrogenated versions thereof, for example tetrahydroindenyl ligands. $L^A$ and $L^B$ may be any other ligand structure capable of π-bonding to M. The atomic molecular weight of $L^A$ and $L^B$ may exceed 60 a.m.u., or may exceed 65 a.m.u. $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligand. Other $L^A$ and $L^B$ ligands include but are not limited to amides, phosphides, alkoxides, aryloxides, imides, carbolides, borollides, porphyrins, phthalocyanines, corrins and other polyazomacrocycles. Independently, each $L^A$ and $L^B$ may be the same or different type of ligand that is bonded to M. In one alternative of Formula 5 only one of either $L^A$ and $L^B$ may be present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbamoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that may also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis(difluoromethyl)silyl, bromomethyldimethylgermyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R may form a carbon sigma bond to the metal M.

Other ligands may be bonded to the metal M, such as at least one leaving group Q. Q may be a monoanionic labile ligand having a sigma-bond to M. Depending on the oxidation state of the metal, the value for n may be 0, 1 or 2 such that Formula 5 above represents a neutral metallocene catalyst compound.

Non-limiting examples of Q ligands may include weak bases such as amines, phosphines, ethers, carboxylates, dienes, hydrocarbyl radicals having from 1 to 20 carbon atoms, hydrides or halogens and the like or a combination thereof. Two or more Q's may form a part of a fused ring or ring system. Other examples of Q ligands include those substituents for R as described above and including cyclobutyl, cyclohexyl, heptyl, tolyl, trifluoromethyl, tetramethylene, pentamethylene, methylidene, methoxy, ethoxy, propoxy, phenoxy, bis(N-methylanilide), dimethylamide, dimethylphosphide radicals and the like.

The catalyst composition may include one or more metallocene catalyst compounds where $L^A$ and $L^B$ of Formula 5 are bridged to each other by at least one bridging group, A, as represented by Formula 6:

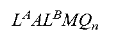

$$L^AAL^BMQ_n \quad \text{Formula 6}$$

The compounds of Formula 6 are known as bridged, metallocene catalyst compounds. $L^A$, $L^B$, M, Q and n are as defined above. Non-limiting examples of bridging group A include bridging groups containing at least one Group 13 to 16 atom, often referred to as a divalent moiety such as but not limited to at least one of a carbon, oxygen, nitrogen, silicon, aluminum, boron, germanium and tin atom or a combination thereof. Bridging group A may contain a carbon, silicon or germanium atom, preferably A contains at least one silicon atom or at least one carbon atom. The bridging group A may also contain substituent groups R as defined above including halogens and iron. Non-limiting examples of bridging group A may be represented by $R'_2C$, $R'_2Si$, $R'_2Si$ $R'_2Si$, $R'_2Ge$, R'P, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. The bridged, metallocene catalyst compounds of Formula 4 may have two or more bridging groups A (EP 0 664 301 B1.

The metallocene catalyst compounds may be those where the R substituents on the ligands $L^A$ and $L^B$ of Formulas 5 and 6 are substituted with the same or different number of substituents on each of the ligands. The ligands $L^A$ and $L^B$ of Formulas 5 and 6 may be different from each other.

The main catalyst system includes a main catalyst compound represented by Formula 2 above, such as a compound having the formula $[(2,3,4,5,6\text{-}Me_5C_6)NCH_2CH_2]_2NHZrBn_2$, where $2,3,4,5,6\text{-}Me_5C_6$ represents a pentamethylphenyl group, and Bn is a benzyl group. Optionally, the main catalyst system may include a second main catalyst compound that may be represented by Formula 5 above, such as a zirconocene compound, such as (n-butylcyclopentadienyl)$_2$zirconium(IV) dichloride or (propylcyclopentadienyl)(1,3-dimethyl-4,5,6,7-tetrahydroindenyl)zirconium(IV) dimethyl.

The molar ratio of the HMW catalyst compound to the LMW catalyst compound in the catalyst formulation may be in the range from 1:20 to 20:1, or from 1:10 to 10:1, or from 1:5 to 5:1, or from 1:1 to 5:1, or from 1:1 to 3:1.

The trim catalyst may comprise a catalyst compound that may be represented by Formula 7 below; specifically, Formula 7 shows (1,3-dimethyl-4,5,6,7-tetrahydroindene)(methyl cyclopentadienyl)zirconium dimethyl:

Formula 7

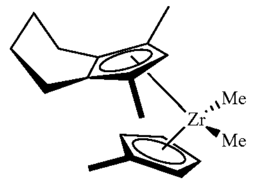

As used herein, the term "activator" may include any combination of reagents that increases the rate at which a transition metal compound oligomerizes or polymerizes unsaturated monomers, such as olefins. An activator may also affect the molecular weight, degree of branching, comonomer content, or other properties of the oligomer or polymer. The transition metal compounds may be activated for oligomerization and/or polymerization catalysis in any manner sufficient to allow coordination or cationic oligomerization and or polymerization.

Alumoxane activators may be utilized as an activator for one or more of the catalyst compositions. Alumoxane(s) or aluminoxane(s) are generally oligomeric compounds containing —Al(R)—O— subunits, where R is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is a halide. Mixtures of different alumoxanes and modified alumoxanes may also be used. For further descriptions, see U.S. Pat. Nos. 4,665,208; 4,952,540; 5,041,584; 5,091,352; 5,206,199; 5,204,419; 4,874,734; 4,924,018; 4,908,463; 4,968,827; 5,329,032; 5,248,801; 5,235,081; 5,157,137; 5,103,031; and EP 0 561 476; EP 0 279 586; EP 0 516 476; EP 0 594 218; and WO 94/10180.

When the activator is an alumoxane (modified or unmodified), the maximum amount of activator may be selected to be a 5000-fold molar excess Al/M over the catalyst precursor (per metal catalytic site). Alternatively or additionally the minimum amount of activator-to-catalyst-precursor may be set at a 1:1 molar ratio.

Aluminum alkyl or organoaluminum compounds that may be utilized as activators (or scavengers) include trimethylaluminum, triethylaluminum, triisobutylaluminum, tri-n-hexylaluminum, tri-n-octylaluminum and the like.

The catalyst systems may include a support material or carrier. For example, the at least one or more catalyst compounds and/or one or more activators may be deposited on, contacted with, vaporized with, bonded to, or incorporated within, adsorbed or absorbed in, or on, one or more supports or carriers. Thus, the above described catalyst compounds as well as other transition metal catalyst compounds and/or catalyst systems may be combined with one or more support materials or carriers using one of the support methods well known in the art or as described below. For example, a metallocene catalyst compound or catalyst system is in a supported form, for example, when deposited on, contacted with, or incorporated within, adsorbed or absorbed in, or on, a support or carrier.

As used herein, the terms "support" and "carrier" are used interchangeably and are any support material, including a porous support material, for example, talc, inorganic oxides, and inorganic chlorides. Other carriers include resinous support materials such as polystyrene, functionalized or crosslinked organic supports, such as polystyrene divinyl benzene polyolefins or other polymeric compounds, zeolites, clays or any other organic or inorganic support material and the like, or mixtures thereof.

Illustrative support materials such as inorganic oxides include Group 2, 3, 4, 5, 13 or 14 metal oxides. The preferred supports include silica, which may or may not be dehydrated, fumed silica, alumina (see, for example, WO 99/60033), silica-alumina and mixtures thereof. Other useful supports include magnesia, titania, zirconia, magnesium chloride (U.S. Pat. No. 5,965,477), montmorillonite (EP 0 511 665), phyllosilicate, zeolites, talc, clays (U.S. Pat. No. 6,034,187), and the like. Also, combinations of these support materials may be used, for example, silica-chromium, silica-alumina, silica-titania and the like. Additional support materials may include those porous acrylic polymers described in EP 0 767 184, which is incorporated herein by reference. Other support materials include nanocomposites as disclosed in WO 99/47598; aerogels as disclosed in WO 99/48605; spherulites as disclosed in U.S. Pat. No. 5,972,510; and polymeric beads as disclosed in WO 99/50311.

In some embodiments, all catalyst compounds of the catalyst system independently may be unsupported, alternatively supported on a support material, in which latter case the catalyst system is a supported catalyst system. When each catalyst compound is supported, the catalyst compounds may reside on the same support material (e.g., same particles), or on different support materials (e.g., different particles). The bimodal catalyst system includes mixtures of unsupported catalyst compounds in slurry form and/or solution form. The support material may be a silica (e.g., fumed silica), alumina, a clay, or talc. The fumed silica may be hydrophilic (untreated), alternatively hydrophobic (treated). In some aspects the support is the hydrophobic fumed silica, which may be prepared by treating an untreated fumed silica with a treating agent such as dimethyldichlorosilane, a polydimethylsiloxane fluid, or hexamethyldisilazane. In some aspects the treating agent is dimethyldichlorosilane.

In some embodiments, the support material, such as an inorganic oxide, may have a surface area in the range of from 10 $m^2/g$ to 700 $m^2/g$, pore volume in the range of from 0.1 $cm^3/g$ to 4.0 $cm^3/g$ and average particle size in the range of from 5 microns to 500 microns. More preferably, the surface area of the support material may be in the range from 50 $m^2/g$ to 500 $m^2/g$, pore volume from 0.5 $cm^3/g$ to 3.5 $cm^3/g$ and average particle size of from 10 microns to 200 microns. Most preferably the surface area of the support material may be in the range is from 100 $m^2/g$ to 400 $m^2/g$, pore volume from 0.8 $cm^3/g$ to 3.0 $cm^3/g$ and average particle size is from 5 microns to 100 microns. The average pore size of the carrier typically has pore size in the range of from 10 Angstroms to 1,000 Angstroms, alternatively from 50 Angstroms to 500 Angstroms, and in some embodiments from 75 Angstroms to 350 Angstroms. There are various other methods in the art for supporting a polymerization catalyst compound or catalyst system. For example, the metallocene catalyst compounds may contain a polymer bound ligand as described in, for example, U.S. Pat. Nos. 5,473,202 and 5,770,755. The metallocene catalyst compounds may be spray dried as described in, for example, U.S. Pat. No. 5,648,310. The support used with the metallocene catalyst compounds may be functionalized, as described in EP 0 802 203, or at least one substituent or leaving group is selected as described in U.S. Pat. No. 5,688,880.

The polyethylene formulations disclosed herein may be made by gas phase processes. The formulations may be made in a single reactor. The polyethylene formulations disclosed herein may also be made in a single gas phase reactor. In one embodiment of the invention, the reactor is a gas phase fluidized bed polymerization reactor.

The polyethylene may be produced using a staged gas phase reactor. Commercial polymerization systems are described in, for example, "Volume 2, Metallocene-Based Polyolefins," at pages 366-378 (John Scheirs & W. Kaminsky, eds. John Wiley & Sons, Ltd. 2000); U.S. Pat. Nos. 5,665,818; 5,677,375; and 6,472,484; and EP 0 517 868 and EP 0 794 200.

Gas phase processes may utilize a fluidized bed reactor. A fluidized bed reactor may include a reaction zone and a so-called velocity reduction zone. The reaction zone may include a bed of growing polymer particles, formed polymer particles and a minor amount of catalyst particles fluidized by the continuous flow of the gaseous monomer and diluent to remove heat of polymerization through the reaction zone. Optionally, some of the re-circulated gases may be cooled and compressed to form liquids that increase the heat removal capacity of the circulating gas stream when readmitted to the reaction zone. A suitable rate of gas flow may be readily determined by simple experiment. Make up of gaseous monomer to the circulating gas stream may be at a rate equal to the rate at which particulate polymer product and monomer associated therewith may be withdrawn from the reactor and the composition of the gas passing through the reactor may be adjusted to maintain an essentially steady state gaseous composition within the reaction zone. The gas leaving the reaction zone may be passed to the velocity reduction zone where entrained particles are removed. Finer entrained particles and dust may be removed in a cyclone and/or fine filter. The gas may be passed through a heat exchanger where the heat of polymerization may be removed, compressed in a compressor, and then returned to the reaction zone. Additional reactor details and means for operating the reactor are described in, for example, U.S. Pat. Nos. 3,709,853; 4,003,712; 4,011,382; 4,302,566; 4,543,399; 4,882,400; 5,352,749; and 5,541,270; EP 0802202; and Belgian Patent No. 839,380.

The reactor temperature of the fluidized bed process may range from 30° C. or 40° C. or 50° C. to 90° C. or 100° C. or 110° C. or 120° C. or 150° C. In general, the reactor temperature may be operated at the highest temperature feasible taking into account the sintering temperature of the ethylene-based polymer product within the reactor. Regardless of the process used to make the polyolefins, e.g., bimodal polyethylene, the polymerization temperature or reaction temperature should be below the melting or "sintering" temperature of the ethylene-based polymer to be formed. Thus, the upper temperature limit may be the melting temperature of the polyolefin produced in the reactor.

Hydrogen gas may be used in olefin polymerization to control the final properties of the polyolefin, such as described in "Polypropylene Handbook," at pages 76-78 (Hanser Publishers, 1996). The amount of hydrogen in the polymerization may be expressed as a mole ratio relative to the total polymerizable monomer, for example, ethylene, or a blend of ethylene and 1-hexene or propylene. The amount of hydrogen used in the polymerization process may be an amount necessary to achieve the desired MFR or FI of the final polyolefin resin. The amount of hydrogen used in the polymerization process may also be an amount necessary to achieve a desired bimodal molecular weight distribution between the high molecular weight component and the low molecular weight component of a bimodal polyolefin.

The catalyst system may also be used to further control the properties of the polyethylene formulation. For example, the amount of trim catalyst may be adjusted to modify the in-reactor ratio of the catalyst compounds of the catalyst system so as to achieve a desired flow index or flow index split. The trim catalyst may be fed directly to the reactor separately from the main catalyst compound of the catalyst system. The trim catalyst may also be mixed with the main catalyst compound of the catalyst system prior to feeding to the reactor. The trim catalyst may also be continuously mixed with the other compounds of the catalyst system and the resulting mixture continuously fed to the reactor. The trim catalyst may be continuously mixed with a supported catalyst and the resulting mixture continuously fed to the reactor. The trim catalyst may be a supported catalyst or an unsupported catalyst. Where the trim catalyst is an unsupported catalyst it may be supported 'in-line' for example by contacting with a supported catalyst prior to feeding to the reactor. The supported trim catalyst may comprise an activator that may activate the trim catalyst 'in-line' prior to feeding to the reactor.

The trim catalyst may be provided in a form that is the same or different to that of the main catalyst compound (or one of the main catalyst compounds) of the catalyst system. However, upon activation by a suitable activator the active catalyst species resulting from the trim catalyst may be the same as the active catalyst species resulting from one of the at least two different catalyst compounds of the catalyst. The skilled person would appreciate that, for example, a metallocene dihalide and a metallocene dialkyl may yield the same active catalyst species upon treatment with a suitable activator. For example, a metallocene such as (cyclopentadienyl)(1,3-dimethyl-4,5,6,7-tetrahydroindenyl)zirconium $(X)_2$ (where X can be a halide, alkyl, or any other leaving group as previously described) may be used in the dichloride form to make a supported catalyst. When used as a trim catalyst it may be provided in the dialkyl form such as the dimethyl form. This may be advantageous in regard to solubility where dialkyl forms may have enhanced solubility in, for example, aliphatic hydrocarbons.

The catalyst system may comprise at least one, or two or more, catalyst compound(s) comprising a titanium, a zirconium, or a hafnium atom. The catalyst system may comprise at least one, or two or more, of the following:

(pentamethylcyclopentadienyl)(n-propylcyclopentadienyl) $MX_2$;
(tetramethylcyclopentadienyl)(n-propylcyclopentadienyl) $MX_2$;
(tetramethylcyclopentadienyl)(n-butylcyclopentadienyl) $MX_2$;
(n-propylcyclopentadienyl)(1,3-dimethyl-4,5,6,7-tetrahydroindenyl)$MX_2$;
(methylcyclopentadienyl)(1,3-dimethyl-4,5,6,7-tetrahydroindenyl)$MX_2$;
(cyclopentadienyl)(1,3-dimethyl-4,5,6,7-tetrahydroindenyl) $MX_2$;
(methylcyclopentadienyl)(1-methyl-4,5,6,7-tetrahydroindenyl)$MX_2$;
$Me_2Si(indenyl)_2MX_2$;
$Me_2Si(4,5,6,7\text{-tetrahydroindenyl})_2MX_2$;
(n-propyl cyclopentadienyl)$_2MX_2$;
(n-butyl cyclopentadienyl)$_2MX_2$;
(1-methyl, 3-butyl cyclopentadienyl)$_2MX_2$;
$[HN(CH_2CH_2N(2,4,6\text{-}Me_3C_6H_2))_2]MX_2$;
$[HN(CH_2CH_2N(2,3,4,5,6\text{-}Me_5C_6))_2]MX_2$;

and mixtures thereof, wherein M is Zr or Hf, and X is selected from F, Cl, Br, I, Me, benzyl, $CH_2SiMe_3$, and $C_1$ to $C_5$ alkyls or alkenyls.

The mole ratio of hydrogen to total monomer ($H_2$:monomer) may be in a range from greater than 0.0001, greater than 0.0005, or greater than 0.001, and less than 10, less than 5, less than 3, or less than 0.10, wherein a desirable range may include any combination of any upper mole ratio limit with any lower mole ratio limit described herein.

The one or more reactor pressures in a gas phase process (either single stage or two or more stages) may vary from 690 kPa (100 psig) to 3,448 kPa (500 psig). For example, they may range from 1,379 kPa (200 psig) to 2,759 kPa (400 psig) or from 1,724 kPa (250 psig) to 2,414 kPa (350 psig).

In embodiments, the bimodal polyethylene may have a density greater than or equal to 0.933 g/cm$^3$, such as greater than or equal to 0.936 g/cm$^3$, greater than or equal to 0.939 g/cm$^3$, greater than or equal to 0.942 g/cm$^3$, greater than or equal to 0.945 $g/cm^3$, greater than or equal to 0.948 $g/cm^3$, greater than or equal to 0.951 $g/cm^3$, greater than or equal to 0.954 $g/cm^3$, or greater than or equal to 0.957 $g/cm^3$. The bimodal polyethylene may also have a density less than or equal to 0.960 $g/cm^3$, such as less than or equal to 0.957 $g/cm^3$, less than or equal to 0.954 $g/cm^3$, less than or equal to 0.951 $g/cm^3$, less than or equal to 0.948 $g/cm^3$, less than or equal to 0.945 $g/cm^3$, less than or equal to 0.942 $g/cm^3$, less than or equal to 0.939 $g/cm^3$, or less than or equal to 0.936 $g/cm^3$. For example, the bimodal polyethylene may have a density of from 0.933 $g/cm^3$ to 0.960 $g/cm^3$, from 0.933 $g/cm^3$ to 0.957 $g/cm^3$, from 0.933 $g/cm^3$ to 0.954 $g/cm^3$, from 0.933 $g/cm^3$ to 0.951 $g/cm^3$, from 0.933 $g/cm^3$ to 0.948 $g/cm^3$, from 0.933 $g/cm^3$ to 0.945 $g/cm^3$, from 0.933 $g/cm^3$ to 0.942 $g/cm^3$, from 0.933 $g/cm^3$ to 0.9390 $g/cm^3$, from 0.933 $g/cm^3$ to 0.936 $g/cm^3$, from 0.936 $g/cm^3$ to 0.960 $g/cm^3$, from 0.936 $g/cm^3$ to 0.957 $g/cm^3$, from 0.936 $g/cm^3$ to 0.954 $g/cm^3$, from 0.936 $g/cm^3$ to 0.951 $g/cm^3$, from 0.936 $g/cm^3$ to 0.948 $g/cm^3$, from 0.936 $g/cm^3$ to 0.945 $g/cm^3$, from 0.936 $g/cm^3$ to 0.942 $g/cm^3$, from 0.936 $g/cm^3$ to 0.939 $g/cm^3$, from 0.939 $g/cm^3$ to 0.960 $g/cm^3$, from 0.939 $g/cm^3$ to 0.957 $g/cm^3$, from 0.939 $g/cm^3$ to 0.954 $g/cm^3$, from 0.939 $g/cm^3$ to 0.951 $g/cm^3$, from 0.939 $g/cm^3$ to 0.948 $g/cm^3$, from 0.939 $g/cm^3$ to 0.945 $g/cm^3$, from 0.939 $g/cm^3$ to 0.942 $g/cm^3$, from 0.942 $g/cm^3$ to 0.960 $g/cm^3$, from 0.942 $g/cm^3$ to 0.957 $g/cm^3$, from 0.942 $g/cm^3$ to 0.954 $g/cm^3$, from 0.942 $g/cm^3$ to 0.951 $g/cm^3$, from 0.942 $g/cm^3$ to 0.948 $g/cm^3$, from 0.942 $g/cm^3$ to 0.945 $g/cm^3$, from 0.945 $g/cm^3$ to 0.960 $g/cm^3$, from 0.945 $g/cm^3$ to 0.957 $g/cm^3$, from 0.945 $g/cm^3$ to 0.954 $g/cm^3$, from 0.945 $g/cm^3$ to 0.951 $g/cm^3$, from 0.945 $g/cm^3$ to 0.948 $g/cm^3$, from 0.948 $g/cm^3$ to 0.960 $g/cm^3$, from 0.948 $g/cm^3$ to 0.957 $g/cm^3$, from 0.948 $g/cm^3$ to 0.954 $g/cm^3$, from 0.948 $g/cm^3$ to 0.951 $g/cm^3$, from 0.951 $g/cm^3$ to 0.960 $g/cm^3$, from 0.951 $g/cm^3$ to 0.957 $g/cm^3$, from 0.951 $g/cm^3$ to 0.954 $g/cm^3$, from 0.954 $g/cm^3$ to 0.960 $g/cm^3$, from 0.954 $g/cm^3$ to 0.957 $g/cm^3$, or from 0.957 $g/cm^3$ to 0.960 $g/cm^3$. As noted hereinabove, when the density of the bimodal polyethylene is greater than, for example, 0.960 $g/cm^3$, articles manufactured from the bimodal polyethylene may have poor environmental stress-cracking resistance, which leads to brittle failure of the insulation and jacket layers. In contrast, when the density of the bimodal polyethylene is less than, for example, 0.933 $g/cm^3$, the mechanical properties of the articles, as well as the processability of the bimodal polyethylene may be reduced.

In embodiments, the bimodal polyethylene may have a melt index ($I_2$) greater than or equal to 0.30 dg/min, such as greater than or equal to 0.60 dg/min, greater than or equal to 0.90 dg/min, greater than or equal to 1.20 dg/min, greater than or equal to 1.50 dg/min, or greater than or equal to 1.80 dg/min. The bimodal polyethylene may also have a melt index ($I_2$) less than or equal to 2.00 dg/min, such as less than or equal to 1.80 dg/min, less than or equal to 1.50 dg/min, less than or equal to 1.20 dg/min, less than or equal to 0.90 dg/min, or less than or equal to 0.60 dg/min. For example, the bimodal polyethylene may have a melt index ($I_2$) of from 0.30 dg/min to 2.00 dg/min, from 0.30 dg/min to 1.80 dg/min, from 0.30 dg/min to 1.50 dg/min, from 0.30 dg/min to 1.20 dg/min, from 0.30 dg/min to 0.90 dg/min, from 0.30 dg/min to 0.60 dg/min, from 0.60 dg/min to 2.00 dg/min, from 0.60 dg/min to 1.80 dg/min, from 0.60 dg/min to 1.50 dg/min, from 0.60 dg/min to 1.20 dg/min, from 0.60 dg/min to 0.90 dg/min, from 0.90 dg/min to 2.00 dg/min, from 0.90 dg/min to 1.80 dg/min, from 0.90 dg/min to 1.50 dg/min, from 0.90 dg/min to 1.20 dg/min, from 1.20 dg/min to 2.00 dg/min, from 1.20 dg/min to 1.80 dg/min, from 1.20 dg/min to 1.50 dg/min, from 1.50 dg/min to 2.00 dg/min, from 1.50 dg/min to 1.80 dg/min, or from 1.50 dg/min to 2.00 dg/min.

In embodiments, the bimodal polyethylene may have a high load melt index ($I_{21}$) greater than or equal to 25.0 dg/min, such as greater than or equal to 35.0 dg/min, greater than or equal to 45.0 dg/min, greater than or equal to 55.0 dg/min, greater than or equal to 65.0 dg/min, greater than or equal to 75.0 dg/min, greater than or equal to 85.0 dg/min, greater than or equal to 95.0 dg/min, greater than or equal to 105.0 dg/min, or greater than or equal to 115.0 dg/min. The bimodal polyethylene may also have a high load melt index ($I_{21}$) less than or equal to 125.0 dg/min, such as less than or equal to 115.0 dg/min, less than or equal to 105.0 dg/min, less than or equal to 95.0 dg/min, less than or equal to 85.0 dg/min, less than or equal to 75.0 dg/min, less than or equal to 65.0 dg/min, less than or equal to 55.0 dg/min, less than or equal to 45.0 dg/min, or less than or equal to 35.0 dg/min. For example, the bimodal polyethylene may have a high load melt index ($I_{21}$) of from 25.0 dg/min to 125.0 dg/min, from 25.0 dg/min to 115.0 dg/min, from 25.0 dg/min to 105.0 dg/min, from 25.0 dg/min to 95.0 dg/min, from 25.0 dg/min to 85.0 dg/min, from 25.0 dg/min to 75.0 dg/min, from 25.0 dg/min to 65.0 dg/min, from 25.0 dg/min to 55.0 dg/min, from 25.0 dg/min to 45.0 dg/min, from 25.0 dg/min to 35.0 dg/min, from 35.0 dg/min to 125.0 dg/min, from 35.0 dg/min to 115.0 dg/min, from 35.0 dg/min to 105.0 dg/min, from 35.0 dg/min to 95.0 dg/min, from 35.0 dg/min to 85.0 dg/min, from 35.0 dg/min to 75.0 dg/min, from 35.0 dg/min to 65.0 dg/min, from 35.0 dg/min to 55.0 dg/min, from 35.0 dg/min to 45.0 dg/min, from 45.0 dg/min to 125.0 dg/min, from 45.0 dg/min to 115.0 dg/min, from 45.0 dg/min to 105.0 dg/min, from 45.0 dg/min to 95.0 dg/min, from 45.0 dg/min to 85.0 dg/min, from 45.0 dg/min to 75.0 dg/min, from 45.0 dg/min to 65.0 dg/min, from 45.0 dg/min to 55.0 dg/min, from 55.0 dg/min to 125.0 dg/min, from 55.0 dg/min to 115.0 dg/min, from 55.0 dg/min to 105.0 dg/min, from 55.0 dg/min to 95.0 dg/min, from 55.0 dg/min to 85.0 dg/min, from 55.0 dg/min to 75.0 dg/min, from 55.0 dg/min to 65.0 dg/min, from 65.0 dg/min to 125.0 dg/min, from 65.0 dg/min to 115.0 dg/min, from 65.0 dg/min to 105.0 dg/min, from 65.0 dg/min to 95.0 dg/min, from 65.0 dg/min to 85.0 dg/min, from 65.0 dg/min to 75.0 dg/min, from 75.0 dg/min to 125.0 dg/min, from 75.0 dg/min to 115.0 dg/min, from 75.0 dg/min to 105.0 dg/min, from 75.0 dg/min to 95.0 dg/min, from 75.0 dg/min to 85.0 dg/min, from 85.0 dg/min to 125.0 dg/min, from 85.0 dg/min to 115.0 dg/min, from 85.0 dg/min to 105.0 dg/min, from 85.0 dg/min to 95.0 dg/min, from 95.0 dg/min to 125.0 dg/min, from 95.0 dg/min to 115.0 dg/min, from 95.0 dg/min to 105.0 dg/min, from 105.0 dg/min to 125.0 dg/min, from 105.0 dg/min to 115.0 dg/min, or from 115.0 dg/min to 125.0 dg/min.

In embodiments, the bimodal polyethylene may have a melt flow ratio ($MFR_{21}$) greater than or equal to 80.0, such as greater than or equal to 90.0, greater than or equal to 100.0, greater than or equal to 110.0, greater than or equal to 120.0, greater than or equal to 130.0, or greater than or equal to 140.0. The bimodal polyethylene may also have a melt flow ratio ($MFR_{21}$) less than or equal to 150.0, such as less than or equal to 140.0, less than or equal to 130.0, less than or equal to 120.0, less than or equal to 110.0, less than or equal to 100.0, or less than or equal to 90.0. For example, the bimodal polyethylene may have a melt flow ratio ($MFR_{21}$) of from 80.0 to 150.0, from 80.0 to 140.0, from 80.0 to 130.0, from 80.0 to 120.0, from 80.0 to 110.0, from 80.0 to 100.0, from 80.0 to 90.0, from 90.0 to 150.0, from 90.0 to 140.0, from 90.0 to 130.0, from 90.0 to 120.0, from 90.0 to 110.0, from 90.0 to 100.0, from 100.0 to 150.0, from 100.0 to 140.0, from 100.0 to 130.0, from 100.0 to 120.0, from 100.0 to 110.0, from 110.0 to 150.0, from 110.0 to 140.0, from 110.0 to 130.0, from 110.0 to 120.0, from 120.0 to 150.0, from 120.0 to 140.0, from 120.0 to 130.0, from 130.0 to 150.0, from 130.0 to 140.0, or from 140.0 to 150.0. When the melt flow ratio ($MFR_{21}$) of the bimodal polyethylene is less than, for example, 80.0, thermoplastic compositions including the bimodal polyethylene may not have adequate processability to manufacture articles, such as, for example, insulation and jacket layers for wires and cables. Moreover, when the melt flow ratio ($MFR_{21}$) of the bimodal polyethylene is less than, for example, 80.0, insulation and jacket layers including the bimodal polyethylene may not have wire smoothness values necessary for some applications.

In embodiments, the bimodal polyethylene may have a number average molecular weight ($M_n$) greater than or equal to 5,000 g/mol, such as greater than or equal to 10,000 g/mol, greater than or equal to 15,000 g/mol, greater than or equal to 20,000 g/mol, or greater than or equal to 25,000 g/mol. The bimodal polyethylene may also have a number average molecular weight ($M_n$) less than or equal to 30,000 g/mol, such as less than or equal to 25,000 g/mol, less than or equal to 20,000 g/mol, less than or equal to 15,000 g/mol, or less than or equal to 10,000 g/mol. For example, the bimodal polyethylene may have a number average molecular weight ($M_n$) of from 5,000 g/mol to 30,000 g/mol, from 5,000 g/mol to 25,000 g/mol, from 5,000 g/mol to 20,000 g/mol, from 5,000 g/mol to 15,000 g/mol, from 5,000 g/mol to 10,000 g/mol, from 10,000 g/mol to 30,000 g/mol, from 10,000 g/mol to 25,000 g/mol, from 10,000 g/mol to 20,000 g/mol, from 10,000 g/mol to 15,000 g/mol, from 15,000 g/mol to 30,000 g/mol, from 15,000 g/mol to 25,000 g/mol, from 15,000 g/mol to 20,000 g/mol, from 20,000 g/mol to 30,000 g/mol, from 20,000 g/mol to 25,000 g/mol, or from 25,000 g/mol to 30,000 g/mol.

In embodiments, the bimodal polyethylene may have a weight average molecular weight ($M_w$) greater than or equal to 100,000 g/mol, such as greater than or equal to 115,000 g/mol, greater than or equal to 130,000 g/mol, greater than or equal to 145,000 g/mol, or greater than or equal to 160,000 g/mol. The bimodal polyethylene may also have a weight average molecular weight ($M_w$) less than or equal to 175,000 g/mol, such as less than or equal to 160,000 g/mol, less than or equal to 145,000 g/mol, less than or equal to 130,000 g/mol, or less than or equal to 115,000 g/mol. For example, the bimodal polyethylene may have a weight average molecular weight ($M_w$) of from 100,000 g/mol to 175,000 g/mol, from 100,000 g/mol to 160,000 g/mol, from 100,000 g/mol to 145,000 g/mol, from 100,000 g/mol to 130,000 g/mol, from 100,000 g/mol to 115,000 g/mol, from 115,000 g/mol to 175,000 g/mol, from 115,000 g/mol to 160,000 g/mol, from 115,000 g/mol to 145,000 g/mol, from 115,000 g/mol to 130,000 g/mol, from 130,000 g/mol to 175,000 g/mol, from 130,000 g/mol to 160,000 g/mol, from 130,000 g/mol to 145,000 g/mol, from 145,000 g/mol to 175,000 g/mol, from 145,000 g/mol to 160,000 g/mol, or from 160,000 g/mol to 175,000 g/mol.

In embodiments, the bimodal polyethylene may have a z-average molecular weight ($M_z$) greater than or equal to 500,000 g/mol, such as greater than or equal to 700,000 g/mol, greater than or equal to 900,000 g/mol, greater than or equal to 1,100,000 g/mol, greater than or equal to 1,300,000 g/mol, greater than or equal to 1,500,000 g/mol, greater than or equal to 1,700,000 g/mol, greater than or equal to 1,900,000 g/mol, greater than or equal to 2,100,000 g/mol, greater than or equal to 2,300,000 g/mol, or greater than or equal to 2,500,000 g/mol. The bimodal polyethylene may also have a z-average molecular weight ($M_z$) less than or equal to 2,700,000 g/mol, such as less than or equal to 2,500,000 g/mol, less than or equal to 2,300,000 g/mol, less than or equal to 2,100,000 g/mol, less than or equal to 1,900,000 g/mol, less than or equal to 1,700,000 g/mol, less than or equal to 1,500,000 g/mol, less than or equal to 1,300,000 g/mol, less than or equal to 1,100,000 g/mol, less than or equal to 900,000 g/mol, or less than or equal to 700,000 g/mol. For example, the bimodal polyethylene may have a z-average molecular weight ($M_z$) of from 500,000 g/mol to 1,500,000 g/mol, from 500,000 g/mol to 1,300,000 g/mol, from 500,000 g/mol to 1,100,000 g/mol, from 500,000 g/mol to 900,000 g/mol, from 500,000 g/mol to 700,000 g/mol, from 700,000 g/mol to 1,500,000 g/mol, from 700,000 g/mol to 1,300,000 g/mol, from 700,000 g/mol to 1,100,000 g/mol, from 700,000 g/mol to 900,000 g/mol, from 900,000 g/mol to 1,500,000 g/mol, from 900,000 g/mol to 1,300,000 g/mol, from 900,000 g/mol to 1,100,000 g/mol, from 1,100,000 g/mol to 1,500,000 g/mol, from 1,100,000 g/mol to 1,300,000 g/mol, or from 1,300,000 g/mol to 1,500,000 g/mol.

In embodiments, the ratio of the weight average molecular weight ($M_w$) of the bimodal polyethylene to the number average molecular weight ($M_n$) of the bimodal polyethylene may be greater than or equal to 6, such as greater than or equal to 8, greater than or equal to 10, greater than or equal to 12, greater than or equal to 14, greater than or equal to 16, or greater than or equal to 18. The ratio of the weight average molecular weight ($M_w$) of the bimodal polyethylene to the number average molecular weight ($M_n$) of the bimodal polyethylene may also be less than or equal to 20, such as less than or equal to 18, less than or equal to 16, less than or equal to 14, or less than or equal to 12. For example, the ratio of the weight average molecular weight ($M_w$) of the bimodal polyethylene to the number average molecular weight ($M_n$) of the bimodal polyethylene may be from 6 to 20, from 6 to 18, from 6 to 16, from 6 to 14, from 6 to 12, from 6 to 10, from 6 to 8, from 8 to 20, from 8 to 18, from 8 to 16, from 8 to 14, from 8 to 12, from 8 to 10, from 10 to 20, from 10 to 18, from 10 to 16, from 10 to 14, from 10 to 12, from 12 to 20, from 12 to 18, from 12 to 16, from 12 to 14, from 14 to 20, from 14 to 18, from 14 to 16, from 16 to 20, from 16 to 18, or from 18 to 20. When the ratio of the weight average molecular weight ($M_w$) of the bimodal polyethylene to the number average molecular weight ($M_n$) of the bimodal polyethylene is less than, for example, 6, thermoplastic compositions including the bimodal polyethylene may not have adequate processability to manufacture articles, such as, for example, insulation and jacket layers for wires and cables. Moreover, when the ratio of the weight average molecular weight ($M_w$) of the bimodal polyethylene to the number average molecular weight ($M_n$) of the bimodal polyethylene is less than, for example, 6, insulation and jacket layers including the bimodal polyethylene may not have wire smoothness values necessary for some applications.

In embodiments, the ratio of the z-average molecular weight ($M_z$) of the bimodal polyethylene to the weight average molecular weight ($M_w$) of the bimodal polyethylene may be greater than or equal to 4, such as greater than or equal to 6, greater than or equal to 8, greater than or equal to 10, greater than or equal to 12, or greater than or equal to 14. The ratio of the z-average molecular weight ($M_z$) of the bimodal polyethylene to the weight average molecular weight ($M_w$) of the bimodal polyethylene may also be less than or equal to 16, such as less than or equal to 14, less than or equal to 12, less than or equal to 10, less than or equal to 8, or less than or equal to 6. For example, the ratio of the z-average molecular weight ($M_z$) of the bimodal polyethylene to the weight average molecular weight ($M_w$) of the bimodal polyethylene may be from 4 to 16, from 4 to 14, from 4 to 12, from 4 to 10, from 4 to 8, from 4 to 6, from 6 to 16, from 6 to 14, from 6 to 12, from 6 to 10, from 6 to 8, from 8 to 16, from 8 to 14, from 8 to 12, from 8 to 10, from 10 to 16, from 10 to 14, from 10 to 12, from 12 to 16, from 12 to 14, or from 14 to 16.

In embodiments, the low molecular weight component of the bimodal polyethylene may have a short chain branching distribution ($SCBD_1$) greater than or equal to 0.1, such as greater than or equal to 1.0, greater than or equal to 2.0, greater than or equal to 3.0, greater than or equal to 4.0, greater than or equal to 5.0, greater than or equal to 6.0, greater than or equal to 7.0, greater than or equal to 8.0, or greater than or equal to 9.0. The low molecular weight component of the bimodal polyethylene may also have a short chain branching distribution ($SCBD_1$) less than or equal to 10.0, such as less than or equal to 9.0, less than or equal to 8.0, less than or equal to 7.0, less than or equal to 6.0, less than or equal to 5.0, less than or equal to 4.0, less than or equal to 3.0, less than or equal to 2.0, or less than or equal to 1.0. For example, the low molecular weight component of the bimodal polyethylene may have a short chain branching distribution ($SCBD_1$) of from 0.1 to 10.0, from 0.1 to 9.0, from 0.1 to 8.0, from 0.1 to 7.0, from 0.1 to 6.0, from 0.1 to 5.0, from 0.1 to 4.0, from 0.1 to 3.0, from 0.1 to 2.0, from 0.1 to 1.0, from 1.0 to 10.0, from 1.0 to 9.0, from 1.0 to 8.0, from 1.0 to 7.0, from 1.0 to 6.0, from 1.0 to 5.0, from 1.0 to 4.0, from 1.0 to 3.0, from 1.0 to 2.0, from 2.0 to 10.0, from 2.0 to 9.0, from 2.0 to 8.0, from 2.0 to 7.0, from 2.0 to 6.0, from 2.0 to 5.0, from 2.0 to 4.0, from 2.0 to 3.0, from 3.0 to 10.0, from 3.0 to 9.0, from 3.0 to 8.0, from 3.0 to 7.0, from 3.0 to 6.0, from 3.0 to 5.0, from 3.0 to 4.0, from 4.0 to 10.0, from 4.0 to 9.0, from 4.0 to 8.0, from 4.0 to 7.0, from 4.0 to 6.0, from 4.0 to 5.0, from 5.0 to 10.0, from 5.0 to 9.0, from 5.0 to 8.0, from 5.0 to 7.0, from 5.0 to 6.0, from 6.0 to 10.0, from 6.0 to 9.0, from 6.0 to 8.0, from 6.0 to 7.0, from 7.0 to 10.0, from 7.0 to 9.0, from 7.0 to 8.0, from 8.0 to 10.0, from 8.0 to 9.0, or form 9.0 to 10.0.

In embodiments, the high molecular weight component of the bimodal polyethylene may have a short chain branching distribution ($SCBD_2$) greater than or equal to 3.0, such as greater than or equal to 4.0, greater than or equal to 5.0, greater than or equal to 6.0, greater than or equal to 7.0, greater than or equal to 8.0, greater than or equal to 9.0, greater than or equal to 10.0, greater than or equal to 11.0, greater than or equal to 12.0, greater than or equal to 13.0, greater than or equal to 14.0, greater than or equal to 15.0, greater than or equal to 16.0, greater than or equal to 17.0, greater than or equal to 18.0, or greater than or equal to 19.0. The high molecular weight component of the bimodal polyethylene may also have a short chain branching distribution ($SCBD_2$) less than or equal to 20.0, such as less than or equal to 19.0, less than or equal to 18.0, less than or equal to 17.0, less than or equal to 16.0, less than or equal to 15.0, less than or equal to 14.0, less than or equal to 13.0, less than or equal to 12.0, less than or equal to 11.0, less than or equal to 10.0, less than or equal to 9.0, less than or equal to 8.0, less than or equal to 7.0, less than or equal to 6.0, less than or equal to 5.0, or less than or equal to 4.0. For example, the high molecular weight component of the bimodal polyethylene may have a short chain branching distribution ($SCBD_2$) of from 3.0 to 20.0, from 3.0 to 19.0, from 3.0 to 18.0, from 3.0 to 17.0, from 3.0 to 16.0, from 3.0 to 15.0, from 3.0 to 14.0, from 3.0 to 13.0, from 3.0 to 12.0, from 3.0 to 11.0, from 3.0 to 10.0, from 3.0 to 9.0, from 3.0 to 8.0, from 3.0 to 7.0, from 3.0 to 6.0, from 5.0 to 5.0, from 3.0 to 4.0, from 4.0 to 20.0, from 4.0 to 19.0, from 4.0 to 18.0, from 4.0 to 17.0, from 4.0 to 16.0, from 4.0 to 15.0, from 4.0 to 14.0, from 4.0 to 13.0, from 4.0 to 12.0, from 4.0 to 11.0, from 4.0 to 10.0, from 4.0 to 9.0, from 4.0 to 8.0, from 4.0 to 7.0, from 4.0 to 6.0, from 4.0 to 5.0, from 5.0 to 20.0, from 5.0 to 19.0, from 5.0 to 18.0, from 5.0 to 17.0, from 5.0 to 16.0, from 5.0 to 15.0, from 5.0 to 14.0, from 5.0 to 13.0, from 5.0 to 12.0, from 5.0 to 11.0, from 5.0 to 10.0, from 5.0 to 9.0, from 5.0 to 8.0, from 5.0 to 7.0, from 5.0 to 6.0, from 6.0 to 20.0, from 6.0 to 19.0, from 6.0 to 18.0, from 6.0 to 17.0, from 6.0 to 16.0, from 6.0 to 15.0, from 6.0 to 14.0, from 6.0 to 13.0, from 6.0 to 12.0, from 6.0 to 11.0, from 6.0 to 10.0, from 6.0 to 9.0, from 6.0 to 8.0, from 6.0 to 7.0, from 7.0 to 20.0, from 7.0 to 19.0, from 7.0 to 18.0, from 7.0 to 17.0, from 7.0 to 16.0, from 7.0 to 15.0, from 7.0 to 14.0, from 7.0 to 13.0, from 7.0 to 12.0, from 7.0 to 11.0, from 7.0 to 10.0, from 7.0 to 9.0, from 7.0 to 8.0, from 8.0 to 20.0, from 8.0 to 19.0, from 8.0 to 18.0, from 8.0 to 17.0, from 8.0 to 16.0, from 8.0 to 15.0, from 8.0 to 14.0, from 8.0 to 13.0, from 8.0 to 12.0, from 8.0 to 11.0, from 8.0 to 10.0, from 8.0 to 9.0, from 9.0 to 20.0, from 9.0 to 19.0, from 9.0 to 18.0, from 9.0 to 17.0, from 9.0 to 16.0, from 9.0 to 15.0, from 9.0 to 14.0, from 9.0 to 13.0, from 9.0 to 12.0, from 9.0 to 11.0, from 9.0 to 10.0, from 10.0 to 20.0, from 10.0 to 19.0, from 10.0 to 18.0, from 10.0 to 17.0, from 10.0 to 16.0, from 10.0 to 15.0, from 10.0 to 14.0, from 10.0 to 13.0, from 10.0 to 12.0, from 10.0 to 11.0, from 11.0 to 20.0, from 11.0 to 19.0, from 11.0 to 18.0, from 11.0 to 17.0, from 11.0 to 16.0, from 11.0 to 15.0, from 11.0 to 14.0, from 11.0 to 13.0, from 11.0 to 12.0, from 12.0 to 20.0, from 12.0 to 19.0, from 12.0 to 18.0, from 12.0 to 17.0, from 12.0 to 16.0, from 12.0 to 15.0, from 12.0 to 14.0, from 12.0 to 13.0, from 13.0 to 20.0, from 13.0 to 19.0, from 13.0 to 18.0, from 13.0 to 17.0, from 13.0 to 16.0, from 13.0 to 15.0, from 13.0 to 14.0, from 14.0 to 20.0, from 14.0 to 19.0, from 14.0 to 18.0, from 14.0 to 17.0, from 14.0 to 16.0, from 14.0 to 15.0, from 15.0 to 20.0, from 15.0 to 19.0, from 15.0 to 18.0, from 15.0 to 17.0, from 15.0 to 16.0, from 16.0 to 20.0, from 16.0 to 19.0, from 16.0 to 18.0, from 16.0 to 17.0, from 17.0 to 20.0, from 17.0 to 19.0, from 17.0 to 18.0, from 18.0 to 20.0, from 18.0 to 19.0, or from 19.0 to 20.0.

In embodiments, the bimodal polyethylene may have a reverse comonomer distribution. Put more simply, in embodiments a ratio of the short chain branching distribution of the high molecular weight component ($SCBD_2$) of the bimodal polyethylene to the short chain branching distribution of the low molecular weight component ($SCBD_1$) of the bimodal polyethylene may be greater than 1.0. Without being bound by any particular theory, it is believed that bimodal polyethylene having a reverse comonomer distribution may have improved environmental stress cracking resistance (ESCR) and balanced mechanical properties compared to bimodal polyethylene having a normal or flat comonomer distribution.

In embodiments, the complex viscosity of the bimodal polyethylene at 190° C. and a frequency of 0.1 rad/s may be greater than or equal to 5,000 Pa·s, such as greater than or equal to 10,000 Pa·s, greater than or equal to 15,000 Pa·s, greater than or equal to 20,000 Pa·s, greater than or equal to 25,000 Pa·s, or greater than or equal to 30,000 Pa·s. The complex viscosity of the bimodal polyethylene at 190° C. and a frequency of 0.1 rad/s may also be less than or equal to 35,000 Pa·s, such as less than or equal to 30,000 Pa·s, less than or equal to 25,000 Pa·s, less than or equal to 20,000 Pa·s, less than or equal to 15,000 Pa·s, or less than or equal to 10,000 Pa·s. For example, the complex viscosity of the bimodal polyethylene at 190° C. and a frequency of 0.1 rad/s may be from 5,000 Pa·s to 35,000 Pa·s, from 5,000 Pa·s to 30,000 Pa·s, from 5,000 Pa·s to 25,000 Pa·s, from 5,000 Pa·s to 20,000 Pa·s, from 5,000 Pa·s to 15,000 Pa·s, from 5,000 Pa·s to 10,000 Pa·s, from 10,000 Pa·s to 35,000 Pa·s, from 10,000 Pa·s to 30,000 Pa·s, from 10,000 Pa·s to 25,000 Pa·s, from 10,000 Pa·s to 20,000 Pa·s, from 10,000 Pa·s to 15,000 Pa·s, from 15,000 Pas to 35,000 Pa·s, from 15,000 Pa·s to 30,000 Pa·s, from 15,000 Pa·s to 25,000 Pa·s, from 15,000 Pa·s to 20,000 Pa·s, from 20,000 Pa·s to 35,000 Pa·s, from 20,000 Pa·s to 30,000 Pa·s, from 20,000 Pa·s to 25,000 Pa·s, from 25,000 Pa·s to 35,000 Pa·s, from 25,000 Pa·s to 30,000 Pa·s, or from 30,000 Pa·s to 35,000 Pa·s.

In embodiments, the complex viscosity of the bimodal polyethylene at 190° C. and a frequency of 1.0 rad/s may be greater than or equal to 5,000 Pa·s, such as greater than or equal to 7,500 Pa·s, greater than or equal to 10,000 Pa·s, greater than or equal to 12,500 Pa·s, greater than or equal to 15,000 Pa·s, or greater than or equal to 17,500 Pa·s. The complex viscosity of the bimodal polyethylene at 190° C. and a frequency of 1.0 rad/s may also be less than or equal to 20,000 Pa·s, such as less than or equal to 17,500 Pa·s, less than or equal to 15,000 Pa·s, less than or equal to 12,500 Pa·s, less than or equal to 10,000 Pa·s, or less than or equal to 7,500 Pa·s. For example, the complex viscosity of the bimodal polyethylene at 190° C. and a frequency of 1.0 rad/s may be from 5,000 Pa·s to 20,000 Pa·s, from 5,000 Pa·s to 17,500 Pa·s, from 5,000 Pa·s to 15,000 Pa·s, from 5,000 Pa·s to 12,500 Pa·s, from 5,000 Pa·s to 10,000 Pa·s, from 5,000 Pa·s to 7,500 Pa·s, from 7,500 Pa·s to 20,000 Pa·s, from 7,500 Pa·s to 17,500 Pa·s, from 7,500 Pa·s to 15,000 Pa·s, from 7,500 Pa·s to 12,500 Pa·s, from 7,500 Pa·s to 10,000 Pa·s, from 10,000 Pa·s to 20,000 Pa·s, from 10,000 Pa·s to 17,500 Pa·s, from 10,000 Pa·s to 15,000 Pa·s, from 12,500 Pa·s to 15,000 Pa·s, from 12,500 Pa·s to 20,000 Pa·s, from 12,500 Pa·s to 17,500 Pa·s, from 12,500 Pas to 15,000 Pa·s, from 15,000 Pa·s to 20,000 Pa·s, from 5,000 Pa·s to 17,500 Pa·s, or from 17,500 Pa·s to 20,000 Pa·s.

In embodiments, the complex viscosity of the bimodal polyethylene at 190° C. and a frequency of 10 rad/s may be greater than or equal to 1,000 Pa·s, greater than or equal to 2,000 Pa·s, such as greater than or equal to 3,000 Pa·s, greater than or equal to 4,000 Pa·s, greater than or equal to 5,000 Pa·s, greater than or equal to 6,000 Pa·s, greater than or equal to 7,000 Pa·s, greater than or equal to 8,000 Pa·s, or greater than or equal to 9,000 Pa·s. The complex viscosity of the bimodal polyethylene at 190° C. and a frequency of 10 rad/s may also be less than or equal to 10,000 Pa·s, such as less than or equal to 9,000 Pa·s, less than or equal to 8,000 Pa·s, less than or equal to 7,000 Pa·s, less than or equal to 6,000 Pa·s, less than or equal to 5,000 Pa·s, less than or equal to 4,000 Pa·s, less than or equal to 3,000 Pa·s, or less than or equal to 2,000 Pa·s. For example, the complex viscosity of the bimodal polyethylene at 190° C. and a frequency of 10 rad/s may be from 1,000 Pa·s to 10,000 Pa·s, from 1,000 Pa·s to 9,000 Pa·s, from 1,000 Pa·s to 8,000 Pa·s, from 1,000 Pa·s to 7,000 Pa·s, from 1,000 Pa·s to 6,000 Pa·s, from 1,000 Pa·s to 5,000 Pa·s, from 1,000 Pa·s to 4,000 Pa·s, from 1,000 Pa·s to 3,000 Pa·s, from 1,000 Pa·s to 2,000 Pa·s, from 2,000 Pa·s to 10,000 Pa·s, from 2,000 Pa·s to 9,000 Pa·s, from 2,000 Pa·s to 8,000 Pa·s, from 2,000 Pa·s to 7,000 Pa·s, from 2,000 Pa·s to 6,000 Pa·s, from 2,000 Pa·s to 5,000 Pa·s, from 2,000 Pa·s to 4,000 Pa·s, from 2,000 Pa·s to 3,000 Pa·s, from 3,000 Pa·s to 10,000 Pa·s, from 3,000 Pas to 9,000 Pa·s, from 3,000 Pa·s to 8,000 Pa·s, from 3,000 Pa·s to 7,000 Pa·s, from 3,000 Pa·s to 6,000 Pa·s, from 3,000 Pa·s to 5,000 Pa·s, from 3,000 Pa·s to 4,000 Pa·s, from 4,000 Pa·s to 10,000 Pa·s, from 4,000 Pa·s to 9,000 Pa·s, from 4,000 Pa·s to 8,000 Pa·s, from 4,000 Pa·s to 7,000 Pa·s, from 4,000 Pa·s to 6,000 Pa·s, from 4,000 Pa·s to 5,000 Pa·s, from 5,000 Pa·s to 10,000 Pa·s, from 5,000 Pa·s to 9,000 Pa·s, from 5,000 Pa·s to 8,000 Pa·s, from 5,000 Pa·s to 7,000 Pa·s, from 5,000 Pa·s to 6,000 Pa·s, from 6,000 Pa·s to 10,000 Pa·s, from 6,000 Pa·s to 9,000 Pa·s, from 6,000 Pa·s to 8,000 Pa·s, from 6,000 Pa·s to 7,000 Pa·s, from 7,000 Pa·s to 10,000 Pa·s, from 7,000 Pa·s to 9,000 Pa·s, from 7,000 Pa·s to 8,000 Pa·s, from 8,000 Pa·s to 10,000 Pa·s, from 8,000 Pa·s to 9,000 Pa·s, or from 9,000 Pa·s to 10,000 Pa·s.

In embodiments, the complex viscosity of the bimodal polyethylene at 190° C. and a frequency of 100 rad/s may be greater than or equal to 500 Pa·s, such as greater than or equal to 800 Pa·s, greater than or equal to 1,100 Pa·s, greater than or equal to 1,400 Pa·s, or greater than or equal to 1,700 Pa·s. The complex viscosity of the bimodal polyethylene at 190° C. and a frequency of 100 rad/s may also be less than or equal to 2,000 Pa·s, such as less than or equal to 1,700 Pa·s, less than or equal to 1,400 Pa s, less than or equal to 1,100 Pa·s, or less than or equal to 800 Pa·s. For example, the complex viscosity of the bimodal polyethylene at 190° C. and a frequency of 100 rad/s may be from 500 Pa·s to 2,000 Pa·s, from 500 Pa·s to 1,700 Pa·s, from 500 Pa·s to 1,400 Pa·s, from 500 Pa·s to 1,100 Pa·s, from 500 Pa·s to 800 Pa·s, from 800 Pa·s to 2,000 Pa·s, from 800 Pa·s to 1,700 Pa·s, from 800 Pa·s to 1,400 Pa·s, from 800 Pa·s to 1,100 Pa·s, from 1,100 Pa·s to 2,000 Pa·s, from 1,100 Pa·s to 1,700 Pa·s, from 1,100 Pa·s to 1,400 Pa·s, from 1,400 Pa·s to 2,000 Pa·s, from 1,400 Pa·s to 1,700 Pa·s, or from 1,700 Pa·s to 2,000 Pa·s.

In embodiments, the ratio of the complex viscosity of the bimodal polyethylene at 190° C. and a frequency of 0.1 rad/s to the complex viscosity of the bimodal polyethylene at 190° C. and a frequency of 100 rad/s (i.e., Shear Thinning Index (SHI)) may be greater than or equal to 5.0, such as greater than or equal to 7.5, greater than or equal to 10.0, greater than or equal to 12.5, greater than or equal to 15.0, or greater than or equal to 17.5. The ratio of the complex viscosity of the bimodal polyethylene at 190° C. and a frequency of 0.1 rad/s to the complex viscosity of the bimodal polyethylene at 190° C. and a frequency of 100 rad/s may also be less than or equal to 22.5, such as less than or equal to 20.0, less than or equal to 17.5, less than or equal to 15.0, less than or equal to 12.5, less than or equal to 10.0, or less than or equal to 7.5. For example, the ratio of the complex viscosity of the bimodal polyethylene at 190° C. and a frequency of 0.1 rad/s to the complex viscosity of the bimodal polyethylene at 190° C. and a frequency of 100 rad/s may be from 5.0 to 22.5, from 5.0 to 20.0, from 5.0 to 17.5, from 5.0 to 15.0, from 5.0 to 12.5, from 5.0 to 10.0, from 5.0 to 7.5, from 7.5 to 22.5, from 7.5 to 20.0, from 7.5 to 17.5, from 7.5 to 15.0, from 7.5 to 12.5, from 7.5 to 10.0, from 10.0 to 22.5, from 10.0 to 20.0, from 10.0 to 17.5, from 10.0 to 15.0, from 10.0 to 12.5, from 12.5 to 22.5, from 12.5 to 20.0, from 12.5 to 17.5, from 12.5 to 15.0, from 15.0 to 22.5, from 15.0 to 20.0, from 15.0 to 17.5, from 17.5 to 22.5, from 17.5 to 20.0, or from 20.0 to 22.5. When the shear thinning index (SHI) of the bimodal polyethylene is less than, for example, 5.0, thermoplastic compositions including the bimodal polyethylene may not have adequate processability to manufacture articles, such as, for example, insulation and jacket layers for wires and cables.

In embodiments, the thermoplastic composition may optionally include one or more additives, such as antistatic agents, colorants (e.g., carbon black), lubricants, pigments, primary antioxidants, secondary antioxidants, processing aids, UV stabilizers, fillers, and combinations thereof. The thermoplastic composition may be produced by physically mixing the post-consumer recycled polyethylene, the virgin raw polyethylene, and any optional additive on the macro level, such as by melt-blending or compounding. In embodiments, the thermoplastic composition may optionally include one or more additives in an amount greater than 0 wt. %, such as greater than or equal to 0.01 wt. %, greater than or equal to 0.05 wt. %, greater than or equal to 0.5 wt. %, greater than or equal to 1 wt. %, greater than or equal to 3 wt. %, greater than or equal to 5 wt. %, greater than or equal to 7 wt. %, or greater than or equal to 9 wt. %, based on the total weight of the thermoplastic composition. The thermoplastic composition may also include one or more additives in an amount less than or equal to 10 wt. %, such as less than or equal to 9 wt. %, less than or equal to 7 wt. %, less than or equal to 5 wt. %, less than or equal to 3 wt. %, less than or equal to 1 wt. %, less than or equal to 0.5 wt. %, less than or equal to 0.05 wt. %, or less than or equal to 0.01 wt. %, based on the total weight of the thermoplastic composition. For example, the thermoplastic composition may include one or more additives in an amount of from 0 wt. % to 10 wt. %, from 0 wt. % to 9 wt. %, from 0 wt. % to 7 wt. %, from 0 wt. % to 5 wt. %, from 0 wt. % to 3 wt. %, from 0 wt. % to 1 wt. %, from 0 wt. % to 0.5 wt. %, from 0 wt. % to 0.05 wt. %, from 0 wt. % to 0.01 wt. %, from 0.01 wt. % to 10 wt. %, from 0.01 wt. % to 9 wt. %, from 0.01 wt. % to 7 wt. %, from 0.01 wt. % to 5 wt. %, from 0.01 wt. % to 3 wt. %, from 0.01 wt. % to 1 wt. %, from 0.01 wt. % to 0.5 wt. %, from 0.01 wt. % to 0.05 wt. %, from 0.05 wt. % to 10 wt. %, from 0.05 wt. % to 9 wt. %, from 0.05 wt. % to 7 wt. %, from 0.05 wt. % to 5 wt. %, from 0.05 wt. % to 3 wt. %, from 0.05 wt. % to 1 wt. %, from 0.05 wt. % to 0.5 wt. %, from 0.5 wt. % to 10 wt. %, from 0.5 wt. % to 9 wt. %, from 0.5 wt. % to 7 wt. %, from 0.5 wt. % to 5 wt. %, from 0.5 wt. % to 3 wt. %, from 0.5 wt. % to 1 wt. %, from 1 wt. % to 10 wt. %, from 1 wt. % to 9 wt. %, from 1 wt. % to 7 wt. %, from 1 wt. % to 5 wt. %, from 1 wt. % to 3 wt. %, from 3 wt. % to 10 wt. %, from 3 wt. % to 9 wt. %, from 3 wt. % to 5 wt. %, from 5 wt. % to 10 wt. %, from 5 wt. % to 9 wt. %, from 5 wt. % to 7 wt. %, from 7 wt. % to 10 wt. %, from 7 wt. % to 9 wt. %, or from 9 wt. % to 10 wt. % based on the total weight of the thermoplastic composition.

In embodiments, the thermoplastic composition may have a density greater than or equal to 0.949 g/cm$^3$, such as greater than or equal to 0.953 g/cm$^3$, greater than or equal to 0.957 g/cm$^3$, or greater than or equal to 0.961 g/cm$^3$. The thermoplastic composition may also have a density less than or equal to 0.966 g/cm$^3$, such as less than or equal to 0.961 g/cm$^3$, less than or equal to 0.957 g/cm$^3$, or less than or equal to 0.953 g/cm$^3$. For example, the thermoplastic composition may have a density of from 0.949 g/cm$^3$ to 0.966 g/cm$^3$, from 0.949 g/cm$^3$ to 0.961 g/cm$^3$, from 0.949 g/cm$^3$ to 0.957 g/cm$^3$, from 0.949 g/cm$^3$ to 0.953 g/cm$^3$, from 0.953 g/cm$^3$ to 0.966 g/cm$^3$, from 0.953 g/cm$^3$ to 0.961 g/cm$^3$, from 0.953 g/cm$^3$ to 0.957 g/cm$^3$, from 0.957 g/cm$^3$ to 0.966 g/cm$^3$, from 0.957 g/cm$^3$ to 0.961 g/cm$^3$, or from 0.961 g/cm$^3$ to 0.966 g/cm$^3$.

In embodiments, the thermoplastic composition may have a melt index ($I_2$) greater than or equal to 0.50 dg/min, such as greater than or equal to 0.60 dg/min, greater than or equal to 0.70 dg/min, or greater than or equal to 0.80 dg/min. The thermoplastic composition may also have a melt index ($I_2$) less than or equal to 0.90 dg/min, such as less than or equal to 0.80 dg/min, less than or equal to 0.70 dg/min, or less than or equal to 0.60 dg/min. For example, the thermoplastic composition may have a melt index ($I_2$) of from 0.50 dg/min to 0.90 dg/min, from 0.50 dg/min to 0.80 dg/min, from 0.50 dg/min to 0.70 dg/min, from 0.50 dg/min to 0.60 dg/min, from 0.60 dg/min to 0.90 dg/min, from 0.60 dg/min to 0.80 dg/min, from 0.60 dg/min to 0.70 dg/min, from 0.70 dg/min to 0.90 dg/min, from 0.70 dg/min to 0.80 dg/min, or from 0.80 dg/min to 0.90 dg/min.

In embodiments, the thermoplastic composition may have a flow index ($I_{21}$) greater than or equal to 60 dg/min, such as greater than or equal to 65 dg/min, greater than or equal to 70 dg/min, or greater than or equal to 75 dg/min. The thermoplastic composition may also have a flow index ($I_{21}$) less than or equal to 80 dg/min, such as less than or equal to 75 dg/min, less than or equal to 70 dg/min, or less than or equal to 65 dg/min. For example, the thermoplastic composition may have a flow index ($I_{21}$) of from 60 dg/min to 80 dg/min, from 60 dg/min to 75 dg/min, from 60 dg/min to 70 dg/min, from 60 dg/min to 65 dg/min, from 65 dg/min to 80 dg/min, from 65 dg/min to 75 dg/min, from 65 dg/min to 70 dg/min, from 70 dg/min to 80 dg/min, from 70 dg/min to 75 dg/min, or from 75 dg/min to 80 dg/min.

In embodiments, the thermoplastic composition may have a melt flow ratio ($MFR_{21}$) greater than or equal to 85, such as greater than or equal to 90, greater than or equal to 95, greater than or equal to 100, greater than or equal to 105 or greater than or equal to 110. In embodiments, the post-consumer recycled polyethylene may also have a melt flow ratio ($MFR_{21}$) less than or equal to 115, such as less than or equal to 110, less than or equal to 105, less than or equal to 100, less than or equal to 95, or less than or equal to 90. For example, the post-consumer recycled polyethylene may also have a melt flow ratio ($MFR_{21}$) of from 85 to 115, from 85 to 110, 85 to 105, from 85 to 100, from 85 to 95, from 85 to 90, from 90 to 115, from 90 to 110, from 90 to 105, from 90 to 100, from 90 to 95, from 95 to 115, from 95 to 110, from 95 to 105, from 95 to 100, from 100 to 115, from 100 to 110, from 100 to 105, from 105 to 115, from 105 to 110, or from 110 to 115.

The thermoplastic composition may be used in a wide variety of products and end-use applications. The thermoplastic composition may also be blended and/or co-extruded with any other polymer. Non-limiting examples of other polymers include linear low density polyethylenes, elastomers, plastomers, high pressure low density polyethylene, high density polyethylenes, polypropylenes and the like. The thermoplastic composition and blends thereof may be used to produce blow molded components or products, among other various end uses. The thermoplastic composition and blends thereof may be useful in forming operations such as film, sheet, and fiber extrusion and co-extrusion as well as blow molding, injection molding and rotary molding. Films may include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, and membranes in food-contact and non-food contact applications. Fibers may include melt spinning, solution spinning and melt blown fiber operations for use in woven or non-woven form to make filters, diaper fabrics, medical garments, and geotextiles. Extruded articles may include medical tubing, wire and cable coatings, pipe, geomembranes, and pond liners. Molded articles may include single and multi-layered constructions in the form of bottles, tanks, large hollow articles, rigid food containers and toys.

Environmental stress-cracking resistance is a measure of the strength of an article in terms of its ability to resist failure by stress crack growth. A high environmental stress-cracking resistance value is important because articles should last through the designed application lifetime. In embodiments, articles comprising the thermoplastic composition may have an environmental stress-cracking resistance greater than 24 hours, such as greater than or equal to 48 hours, greater than or equal to 96 hours, greater than or equal to 192 hours, greater than or equal to 384 hours, greater than or equal to 768 hours, greater than or equal to 1,536 hours, or greater than 3,072 hours. Articles comprising the thermoplastic composition may also have an environmental stress-cracking resistance less than 6,144 hours, such as less than or equal to 3,072 hours, less than or equal to 1,536 hours, less than or equal to 768 hours, less than or equal to 384 hours, less than or equal to 192 hours, less than or equal to 96 hours, or less than 48 hours. For example, articles comprising the thermoplastic composition may have an environmental stress-cracking resistance of from 24 hours to 6,144 hours, from 24 hours to 3,072 hours, from 24 hours to 1,536 hours, from 24 hours to 768 hours, from 24 hours to 384 hours, from 24 hours to 192 hours, from 24 hours to 96 hours, from 24 hours to 48 hours, from 48 hours to 6,144 hours, from 48 hours to 3,072 hours, from 48 hours to 1,536 hours, from 48 hours to 768 hours, from 48 hours to 384 hours, from 48 hours to 192 hours, from 48 hours to 96 hours, from 96 hours to 6,144 hours, from 96 hours to 3,072 hours, from 96 hours to 1,536 hours, from 96 hours to 768 hours, from 96 hours to 384 hours, from 96 hours to 192 hours, from 192 hours to 6,144 hours, from 192 hours to 3,072 hours, from 192 hours to 1,536 hours, from 192 hours to 768 hours, from 192 hours to 384 hours, from 384 hours to 6,144 hours, from 384 hours to 3,072 hours, from 384 hours to 1,536 hours, from 384 hours to 768 hours, from 768 hours to 6,144 hours, from 768 hours to 3,072 hours, from 768 hours to 1,536 hours, from 1,536 hours to 6,144 hours, from 1,536 hours to 3,072 hours, or from 3,072 hours to 6,144 hours.

In embodiments, articles comprising the thermoplastic composition may have a tensile strength greater than 1,400 psi, such as greater than or equal to 1,800 psi, greater than or equal to 2,200 psi, greater than or equal to 2,600 psi, greater than or equal to 3,000 psi, greater than or equal to 3,400 psi, or greater than or equal to 3,800 psi. Articles comprising the thermoplastic composition may also have tensile strength less than 4,200 psi, such as less than or equal to 3,800 psi, less than or equal to 3,400 psi, less than or equal to 3,000 psi, less than or equal to 2,600 psi, less than or equal to 2,200 psi, or less than or equal to 1,800 psi. For example, articles comprising the thermoplastic composition may have a tensile strength of from 1,400 psi to 4,200 psi, from 1,400 psi to 3,800 psi, from 1,400 psi to 3,400 psi, from 1,400 psi to 3,000 psi, from 1,400 psi to 2,600 psi, from 1,400 psi to 2,200 psi, from 1,400 psi to 1,800 psi, from 1,800 psi to 4,200 psi, from 1,800 psi to 3,800 psi, from 1,800 psi to 3,400 psi, from 1,800 psi to 3,000 psi, from 1,800 psi to 2,600 psi, from 1,800 psi to 2,200 psi, from 2,200 psi to 4,200 psi, from 2,200 psi to 3,800 psi, from 2,200 psi to 3,400 psi, from 2,200 psi to 3,000 psi, from 2,200 psi to 2,600 psi, from 2,600 psi to 4,200 psi, from 2,600 psi to 3,800 psi, from 2,600 psi to 3,400 psi, from 2,600 psi to 3,000 psi, from 3,000 psi to 4,200 psi, from 3,000 psi to 3,800 psi, from 3,000 psi to 3,400 psi, from 3,400 psi to 4,200 psi, from 3,400 psi to 3,800 psi, or from 3,800 psi to 4,200 psi.

In embodiments, articles comprising the thermoplastic composition may have an elongation break greater than 200%, such as greater than or equal to 300%, greater than or equal to 400%, greater than or equal to 500%, greater than or equal to 600%, greater than or equal to 700%, or greater than or equal to 800%. Articles comprising the thermoplastic composition may also have an elongation break less than 900%, such as less than or equal to 800%, less than or equal to 700%, less than or equal to 600%, less than or equal to 500%, less than or equal to 400%, or less than or equal to 300%. For example, articles comprising the thermoplastic composition may have an elongation break of from 200% to 900%, from 200% to 800%, from 200% to 700%, from 200% to 600%, from 200% to 500%, from 200% to 400%, from 200% to 300%, from 300% to 900%, from 300% to 800%, from 300% to 700%, from 300% to 600%, from 300% to 500%, from 300% to 400%, from 400% to 900%, from 400% to 800%, from 400% to 700%, from 400% to 600%, from 400% to 500%, from 500% to 900%, from 500% to 800%, from 500% to 700%, from 500% to 600%, from 600% to 900%, from 600% to 800%, from 600% to 700%, from 700% to 900%, from 700% to 800%, or form 800% to 900%.

In embodiments, articles comprising the thermoplastic composition may have a secant modulus ($E_s$) greater than 450 Megapascals (MPa), such as greater than or equal to 550 MPa, greater than or equal to 650 MPa, greater than or equal to 750 MPa, greater than or equal to 850 MPa, greater than or equal to 950 MPa, greater than or equal to 1,050 MPa, greater than or equal to 1,150 MPa, greater than or equal to 1,250 MPa, greater than or equal to 1,350 MPa, greater than or equal to 1,450 MPa. Articles comprising the thermoplastic composition may also have a secant modulus ($E_s$) less than 1,550 MPa, such as less than or equal to 1,450 MPa, less than or equal to 1,350 MPa, less than or equal to 1,250 MPa, less than or equal to 1,150 MPa, less than or equal to 1,050 MPa, less than or equal to 950 MPa, less than or equal to 850 MPa, less than or equal to 750 MPa, less than or equal to 650 MPa, or less than or equal to 450 MPa. For example, articles comprising the thermoplastic composition may have a secant modulus ($E_s$) of from 450 MPa to 1,550 MPa, from 450 MPa to 1,450 MPa, from 450 MPa to 1,350 MPa, from 450 MPa to 1,250 MPa, from 450 MPa to 1,150 MPa, from 450 MPa to 1,050 MPa, from 450 MPa to 950 MPa, from 450 MPa to 850 MPa, from 450 MPa to 750 MPa, from 450 MPa to 650 MPa, from 450 MPa to 550 MPa, from 550 MPa to 1,550 MPa, from 550 MPa to 1,450 MPa, from 550 MPa to 1,350 MPa, from 550 MPa to 1,250 MPa, from 550 MPa to 1,150 MPa, from 550 MPa to 1,050 MPa, from 550 MPa to 950 MPa, from 550 MPa to 850 MPa, from 550 MPa to 750 MPa, from 550 MPa to 650 MPa, from 650 MPa to 1,550 MPa, from 650 MPa to 1,450 MPa, from 650 MPa to 1,350 MPa, from 650 MPa to 1,250 MPa, from 650 MPa to 1,150 MPa, from 650 MPa to 1,050 MPa, from 650 MPa to 950 MPa, from 650 MPa to 850 MPa, from 650 MPa to 750 MPa, from 750 MPa to 1,550 MPa, from 750 MPa to 1,450 MPa, from 750 MPa to 1,350 MPa, from 750 MPa to 1,250 MPa, from 750 MPa to 1,150 MPa, from 750 MPa to 1,050 MPa, from 750 MPa to 950 MPa, from 750 MPa to 850 MPa, from 850 MPa to 1,550 MPa, from 850 MPa to 1,450 MPa, from 850 MPa to 1,350 MPa, from 850 MPa to 1,250 MPa, from 850 MPa to 1,150 MPa, from 850 MPa to 1,050 MPa, from 850 MPa to 950 MPa, from 950 MPa to 1,550 MPa, from 950 MPa to 1,450 MPa, from 950 MPa to 1,350

MPa, from 950 MPa to 1,250 MPa, from 950 MPa to 1,150 MPa, from 950 MPa to 1,050 MPa, from 1,050 MPa to 1,550 MPa, from 1,050 MPa to 1,450 MPa, from 1,050 MPa to 1,350 MPa, from 1,050 MPa to 1,250 MPa, from 1,050 MPa to 1,150 MPa, from 1,150 MPa to 1,550 MPa, from 1,150 MPa to 1,450 MPa, from 1,150 MPa to 1,350 MPa, from 1,150 MPa to 1,250 MPa, from 1,250 MPa to 1,550 MPa, from 1,250 MPa to 1,450 MPa, from 1,250 MPa to 1,350 MPa, from 1,350 MPa to 1,550 MPa, from 1,350 MPa to 1,450 MPa, or form 1,450 MPa to 1,550 MPa.

In embodiments, the thermoplastic composition or blends thereof may be used to manufacture a coated conductor. The coated conductor may include a conductive core and a coating layer covering at least a portion of the conductive core. The conductive core may include metallic wire, optical fiber, or combinations thereof. The coating layer may include the thermoplastic composition or blends thereof. Electricity, light, or combinations thereof, may be transmitted through the conductive core of the coated conductor. This may be accomplished by applying a voltage across the metallic wire, which may cause electrical energy to flow through the metallic wire, sending a pulse of light (e.g., infrared light) through the optical fiber, which may cause light to transmit through the optical fiber, or combinations thereof.

Test Methods

Density

Unless indicated otherwise, all densities disclosed herein were measured according to ASTM D792-08, Method B, and are reported in grams per cubic centimeter (g/cm$^3$).

Samples for density measurements were prepared according to ASTM D4703-10. Samples were pressed at 190° C., for five minutes, at 10,000 psi (68 MPa). The temperature was maintained at 190° C. for the above five minutes, and then the pressure was increased to 30,000 psi (207 MPa) for three minutes. This was followed by a one minute hold at 21° C. and 30,000 psi (207 MPa). Measurements were made within one hour of sample pressing.

Melt Index ($I_2$)

Unless indicated otherwise, all melt indices ($I_2$) disclosed herein were measured according to ASTM D1238-10, Method B, at 190° C. and a 2.16 kg load, and are reported in decigrams per minute (dg/min).

High Load Melt Index ($I_{21}$)

Unless indicated otherwise, all high load melt indices ($I_{21}$) disclosed herein were measured according to ASTM D1238-10, Method B, at 190° C. and a 21.6 kg load, and are reported in decigrams per minute (dg/min).

Molecular Weight

Unless indicated otherwise, all molecular weights disclosed herein, including weight average molecular weight ($M_w$), number average molecular weight ($M_n$), and z-average molecular weight ($M_z$), were measured using conventional Gel Permeation Chromatography (GPC) and are reported in grams per mole (g/mol).

The chromatographic system consisted of a PolymerChar GPC-IR (Valencia, Spain) high temperature GPC chromatograph equipped with an internal IR5 infra-red detector (IR5). The autosampler oven compartment was set at 160 degrees Celsius (° C.) and the column compartment was set at 150° C. The columns used were four Agilent "Mixed A" 30-centimeter 20-micron linear mixed-bed columns. The chromatographic solvent used was 1,2,4 trichlorobenzene and contained 200 parts per million (ppm) of butylated hydroxytoluene (BHT). The solvent source was nitrogen sparged. The injection volume used was 200 microliters and the flow rate was 1.0 milliliters per minute (ml/min).

Calibration of the GPC column set was performed with 21 narrow molecular weight distribution polystyrene standards, commercially available from Agilent Technologies, with molecular weights ranging from 580 g/mol to 8,400,000 g/mol and were arranged in six "cocktail" mixtures with at least a decade of separation between individual molecular weights. The polystyrene standards were prepared at 0.025 grams in 50 milliliters of solvent for molecular weights equal to or greater than 1,000,000 g/mol, and 0.05 grams in 50 milliliters of solvent for molecular weights less than 1,000,000 g/mol. The polystyrene standards were dissolved at 80° C. with gentle agitation for 30 minutes. The polystyrene standard peak molecular weights were converted to polyethylene molecular weights using Equation 1 (as described in Williams and Ward, J. Polym. Sci., Polym. Let., 6, 621 (1968)):

$$M_{polyethylene}=A\times(M_{polystyrene})^B \quad \text{Equation 1}$$

where M is the molecular weight, A has a value of 0.4315, and B is equal to 1.0.

A fifth order polynomial was used to fit the respective polyethylene-equivalent calibration points. A small adjustment to A (from approximately 0.375 to 0.445) was made to correct for column resolution and band-broadening effects such that linear homopolymer polyethylene standard is obtained at a molecular weight of 120,000 g/mol.

The total plate count of the GPC column set was performed with decane (prepared at 0.04 grams in 50 milliliters of TCB and dissolved for 20 minutes with gentle agitation). The plate count (Equation 2) and symmetry (Equation 3) were measured on a 200 microliter injection according to the following equations:

$$\text{Plate Count} = 5.54 * \left(\frac{(RV_{Peak\ Max})}{\text{Peak Width at } \frac{1}{2} \text{ Height}}\right)^2 \quad \text{Equation 2}$$

where RV is the retention volume in milliliters, the peak width is in milliliters, the peak max is the maximum height of the peak, and ½ height is ½ height of the peak maximum; and $$\text{Symmetry} = \frac{(\text{Rear Peak } RV_{One\ Tenth\ Hheight} - RV_{Peak\ Max})}{(RV_{Peak\ Max} - \text{Front Peak } RV_{One\ Tenth\ Height})} \quad \text{Equation 3}$$

where RV is the retention volume in milliliters and the peak width is in milliliters, peak max is the maximum position of the peak, one tenth height is 1/10 height of the peak maximum, and where rear peak refers to the peak tail at later retention volumes than the peak max and where front peak refers to the peak front at earlier retention volumes than the peak max. The plate count for the chromatographic system should be greater than 18,000 and symmetry should be between 0.98 and 1.22.

Samples were prepared in a semi-automatic manner with the PolymerChar "Instrument Control" Software, wherein the samples were weight-targeted at 2 milligrams per milliliter (mg/ml), and the solvent (containing 200 ppm BHT) was added to a pre nitrogen-sparged septa-capped vial, via the PolymerChar high temperature autosampler. The samples were dissolved for 2 hours at 160° C. under "low speed" shaking.

The calculations of weight average molecular weight ($M_{w(GPC)}$), number average molecular weight ($M_{n(GPC)}$), and z-average molecular weight ($M_{z(GPC)}$) were based on GPC results using the internal IR5 detector (measurement channel) of the PolymerChar GPC-IR chromatograph according to Equations 4-6, using the PolymerChar GPCOne™ software, the baseline-subtracted IR chromatogram at each equally-spaced data collection point (i), and the polyethylene equivalent molecular weight obtained from the narrow standard calibration curve for the point (i) from Equation 1.

$$Mn_{(GPC)} = \frac{\sum^{i} IR_i}{\sum^{i} \left(IR_i / M_{polyethylene_i}\right)} \quad \text{Equation 4}$$

$$Mw_{(GPC)} = \frac{\sum^{i} \left(IR_i * M_{polyethylene_i}\right)}{\sum^{i} IR_i} \quad \text{Equation 5}$$

$$Mz_{(GPC)} = \frac{\sum^{i} \left(IR_i * M^2_{polyethylene_i}\right)}{\sum^{i} \left(IR_i * M_{polyethylene_i}\right)} \quad \text{Equation 6}$$

In order to monitor the deviations over time, a flowrate marker (decane) was introduced into each sample via a micropump controlled with the PolymerChar GPC-IR system. This flowrate marker (FM) was used to linearly correct the pump flowrate ($Flowrate_{(Nominal)}$) for each sample by RV alignment of the respective decane peak within the sample ($RV_{(FM\ Sample)}$) to that of the decane peak within the narrow standards calibration ($RV_{(FM\ Calibrated)}$). Any changes in the time of the decane marker peak are then assumed to be related to a linear-shift in flowrate ($Flowrate_{(Effective)}$) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (with respect to the narrow standards calibration) is calculated according to Equation 7. Processing of the flow marker peak was done via the PolymerChar GPCOne™ Software. Acceptable flowrate correction is such that the effective flowrate should be within ±1 percent (%) of the nominal flowrate.

$$Flowrate_{(Effective)} = Flowrate_{(Nominal)} \times \left(\frac{RV_{(FM\ Calibrated)}}{RV_{(FM\ Sample)}}\right) \quad \text{Equation 7}$$

The Systematic Approach for the determination of multi-detector offsets is done in a manner consistent with that published by Balke, Mourey, et. al. (Mourey and Balke, Chromatography Polym. Chpt 12, (1992)) (Balke, Thitiratsakul, Lew, Cheung, Mourey, Chromatography Polym. Chpt 13, (1992)), optimizing triple detector log (MW and IV) results from a broad homopolymer polyethylene standard ($M_w/M_n>3$) to the narrow standard column calibration results from the narrow standards calibration curve using PolymerChar GPCOne™ Software.

The absolute molecular weight data (GPC-LALS) was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, NY (1987)) using PolymerChar GPCOne™ software. The overall injected concentration, used in the determination of the molecular weight, was obtained from the mass detector area and the mass detector constant, derived from a suitable linear polyethylene homopolymer, or one of the polyethylene standards of known weight-average molecular weight. The calculated molecular weights (using GPCOne™) were obtained using a light scattering constant, derived from a homopolymer polyethylene standard, and a refractive index concentration coefficient, dn/dc, of 0.104. Generally, the mass detector response (IR5) and the light scattering constant (determined using GPCOne™) should be determined from a linear standard with a molecular weight in excess of about 50,000 g/mol, preferably in excess of about 120,000 g/mol. Other respective moments, $M_{n(Abs)}$ and $M_{z(Abs)}$ are be calculated according to Equations 8-9 as follows:

$$Mn_{(Abs)} = \frac{\sum^{i} IR_i}{\sum^{i} \left(IR_i / M_{Absolute_i}\right)} \quad \text{Equation 8}$$

$$Mz_{(Abs)} = \frac{\sum^{i} \left(IR_i * M^2_{Absolute_i}\right)}{\sum^{i} \left(IR_i * M_{Absolute_i}\right)} \quad \text{Equation 9}$$

A calibration for the IR5 detector ratioing was performed using multiple ethylene-based polymer of known short chain branching (SCB) frequency (as determined by NMR), ranging from homopolymer (0 SCB/1000 total C) to approximately 40 SCB/1000 total C, where total C=carbons in backbone+carbons in branches. Each standard had a weight-average molecular weight ($M_w$) from 36,000 g/mol to 126,000 g/mol, as determined by the GPC-LALS processing method described above. Each standard had a molecular weight distribution (Mw/Mn) from 2.0 to 2.5, as determined by the GPC-LALS processing method described hereinabove.

The calculated "IR5 Area Ratio" (or "$IR5_{Methyl\ Channel\ Area}/IR5_{Measurement\ Channel\ Area}$") Of "the baseline-subtracted area response of the IR5 methyl channel sensor" to "the baseline-subtracted area response of IR5 measurement channel sensor" was calculated for each of the "SCB" standards. A linear fit of the SCB frequency versus the "IR5 Area Ratio" was constructed according to Equation 10 as follows:

$$SCB/1000 \text{ total } C\ (SCBD) = A_0 + \left[A_1 \times \left(\frac{IR5_{Methyl\ Channel\ Area}}{IR5_{Measurement\ Channel\ Area}}\right)\right] \quad \text{Equation 10}$$

where $A_0$ is the "SCB/1000 total C" intercept at an "IR5 Area Ratio" of zero, and $A_1$ is the slope of the "SCB/1000 total C" versus "IR5 Area Ratio" and represents the increase in the SCB/1000 total C as a function of "IR5 Area Ratio."

The calculations of SBD1, SCBD2 and Comonomer Ratios were based on GPC results using the internal IR5 detector (measurement channel) and the SCB/1000 total C for a bimodal polyethylene resin. To calculate these values the baseline-subtracted IR chromatogram at equally-spaced data collection points (i) and the SCBD surrounding the maxima of the bimodal resin were determined. This calculation is determined for polymer greater than Log M 3.5 for the top two abundance maxima Log $M_{Maxima1}$ and Log $M_{Maxima}2$. Log $M_{Maxima1}$ is defined as the maxima at lower molecular weight relative to the second Log $M_{Maxima2}$ Here m and n, define the molecular weight range at which SCBD1 is calculated where m=(Log $M_{Maxima1}$−0.15) and n=(Log $M_{Maxima1}$+0.15). Here o and p, define the molecular weight range at which SCBD2 is calculated where o=(Log $M_{Maxima2}$−0.15) and p=(Log $M_{Maxima2}$+0.15).

The calculations of short chain branching distributions of low molecular weight components ($SCBD_1$), short chain branching distributions of high molecular weight components ($SCBD_2$), and Comonomer Ratios were based on GPC results using the internal IR5 detector (measurement channel) and the SCB/1000 total C for a bimodal polyethylene. To calculate these values the baseline-subtracted IR chromatogram at equally-spaced data collection points (i) and the SCBD surrounding the maxima of the bimodal resin were determined. This calculation is determined for polymer greater than Log M 3.5 for the top two abundance maxima Log $M_{Maxima1}$ and Log $M_{Maxima2}$. Log $M_{Maxima1}$ is defined as the maxima at lower molecular weight relative to the second Log $M_{Maxima2}$. Here m and n, define the molecular weight range at which $SCBD_1$ is calculated, where m=(Log $M_{Maxima1}$−0.15) and n=(Log $M_{Maxima1}$+0.15). Here o and p, define the molecular weight range at which $SCBD_2$ is calculated, where o=(Log $M_{Maxima2}$−0.15) and p=(Log $M_{Maxima2}$+0.15).

$$SCBD_1 = \frac{\sum_n^m (IR_i * SCBD_i)}{\sum_n^m IR_i} \quad \text{Equation 11}$$

$$SCBD_2 = \frac{\sum_p^o (IR_i * SCBD_i)}{\sum_p^o IR_i} \quad \text{Equation 12}$$

The comonomer distribution (also referred to as a comonomer ratio) is defined according to Equation 13. Any value greater than 1.0 is considered a reverse comonomer distribution, a value less than 1.0 is considered a normal comonomer distribution, and a value of 1.0 is considered a flat comonomer distribution.

$$\text{Comonomer Distribution} = \frac{SCBD_2}{SCBD_1} \quad \text{Equation 13}$$

Complex Viscosity

Unless indicated otherwise, all complex viscosities (η*) disclosed herein were calculated using Dynamic Mechanical Spectroscopy (DMS) and are reported in pascal-seconds (Pa·s).

Samples were compression-molded into "3 mm thick×1 inch" circular plaques at 350° F., for five minutes, under 25,000 psi pressure, in air. The sample was then taken out of the press, and allowed to cool.

A constant temperature frequency sweep was performed using a TA Instruments "Advanced Rheometric Expansion System (ARES)," equipped with 25 mm (diameter) parallel plates, under a nitrogen purge. Samples were placed on the plate and allowed to melt for five minutes at 190° C. The plates were then closed to a gap of "2 mm," the samples trimmed (extra sample that extends beyond the circumference of the "25 mm diameter" plate was removed), and then the tests were started. The method had an additional five minute delay built in to allow for temperature equilibrium. The tests were performed at 190° C. over a frequency range of from 0.1 radians per second (rad/s) to 100 rad/s at a constant strain amplitude of 10%.

Environmental Stress-Cracking Resistance (ESCR)

Unless indicated otherwise, all Environmental Stress-Cracking Resistance (ESCR) values disclosed herein are $F_0$ failure times reported in hours and were measured according to ASTM D1693, Method B, on compression molded samples having a thickness of 75 mm in a 10% Igepal solution at 50° C.

Tensile Strength

Unless indicated otherwise, all tensile strength values disclosed herein were measured according to ASTM D638-14, Type IV, on compression molded samples having a thickness of 75 mm and are reported in megapascals (MPa) and/or pounds per square inch (psi).

Elongation

Unless indicated otherwise, all elongation values disclosed herein were measured according to ASTM D638-14, Type IV, on compression molded samples having a thickness of 75 mm and are reported in percent (%).

Wire Smoothness

Unless indicated otherwise, all wire smoothness values disclosed herein were calculated as an average surface roughness of a coated conductor wire sample (14 American wire gauge (AWG) wire with a 10-15 mm coating thickness) and are reported in microinches (μ-in). The surface roughness values were measured using a Mitutoyo SJ 400 Surface Roughness Tester. Generally, a relatively smoother wire has an average surface roughness less than a relatively rougher wire.

Melting Point

Unless indicated otherwise, all melting points disclosed herein were measured using Differential Scanning Calorimetry (DSC) according to ASTM D3418-15 and are reported in degrees Celsius (° C.).

Differential Scanning Calorimetry (DSC) is used to measure the melting and crystallization behavior of a polymer over a wide range of temperatures. For example, the TA Instruments Q1000 DSC, equipped with an RCS (refrigerated cooling system) and an autosampler is used to perform this analysis. The instrument is first calibrated using the software calibration wizard. A baseline is obtained by heating a cell from −80° C. to 280° C. without any sample in an aluminum DSC pan. Sapphire standards are then used as instructed by the calibration wizard. Next, 1 to 2 milligrams (mg) of a fresh indium sample are analyzed by heating the standards sample to 180° C., cooling to 120° C. at a cooling rate of 10° C./minute, and then keeping the standards sample isothermally at 120° C. for 1 minute. The standards sample is then heated from 120° C. to 180° C. at a heating rate of 10° C./minute. Then, it is determined that indium standards sample has heat of fusion ($H_f$)=28.71±0.50 Joules per gram (J/g) and onset of melting=156.6° C.±0.5° C. Test samples are then analyzed on the DSC instrument.

During testing, a nitrogen purge gas flow of 50 ml/min is used. Each sample is melt pressed into a thin film at about 175° C.; the melted sample is then air-cooled to room temperature (approx. 25° C.). The film sample is formed by pressing a "0.1 to 0.2 gram" sample at 175° C. at 1,500 psi, and 30 seconds, to form a "0.1 to 0.2 mil thick" film. A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C., and held isothermal for five minutes, in order to remove its thermal history. Next, the sample is cooled to −40° C., at a 10° C./minute cooling rate, and held isothermal at −40° C. for five minutes. The sample is then heated to 150° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are peak melting temperature ($T_m$), peak crystallization temperature (Ta), onset crystallization temperature (Tc onset), heat of fusion ($H_f$) (in Joules per gram), and the calculated % crystallinity for polyethylene samples using: % Crystallinity for PE=((Hf)/(292 J/g))×100, and the calculated % crystallinity for polypropylene samples using: % Crystallinity for PP=((Hf)/165 J/g))×100. The heat of fusion ($H_f$) and the peak melting temperature are reported from the second heat curve. Peak crystallization temperature and onset crystallization temperature are determined from the cooling curve.

Modulus

Unless indicated otherwise, all moduli disclosed herein refer to the 2% Secant flexural modulus ($E_s$) measured according to ASTM D790-17 and are reported in Megapascals (MPa) and/or pounds per square inch (psi).

EXAMPLES

Example 1

Two separate bimodal polyethylene were produced via gas phase polymerization in a single-reactor. A main catalyst, which was a spray-dried mixture of bis(2-pentamethylphenylamido)ethyl)amine zirconium dibenzyl, (1,3-dimethyl-4,5,6,7-tetrahydroindene)(methyl cyclopentadienyl) zirconium dimethyl, methylalumoxane (MAO), and fumed silica, commercially available as CAB-O-SIL® TS-610 from Cabot Corporation, in a mineral oil slurry, was fed to a polyethylene reactor, commercially available as UNIPOL™ from Univation Technologies, via a 0.25 inch (") injection tube. A trim catalyst, which was a mixture of 0.04 wt. % (1,3-dimethyl-4,5,6,7-tetrahydroindene)(methyl cyclopentadienyl)zirconium dimethyl bis(n-butylcyclopentadienyl)zirconium dimethyl in isopentane, was also fed to the polyethylene reactor via the same 0.25" injection tube at a rate sufficient to provide the desired resin flow index. The reactor gas composition was controlled by metering the feeds to the polyethylene reactor at rates sufficient to maintain the desired ethylene partial pressure, molar ratio of comonomer to ethylene ($C_2$), molar ratio of hydrogen gas ($H_2$) to ethylene ($C_2$), and amount of isopentane. An additive, commercially available as CA-300 from Univation Technologies, was fed separately to the polyethylene reactor at a rate sufficient to maintain an additive concentration of about 35 parts per million by weight (ppmw) to 40 ppmw based on the ethylene feed rate to the reactor. The polyethylene reactor temperature was maintained at a desired temperature and the reactor residence time was about 2.0 hours. The reactor bed weight was maintained by discharging granular resin into a discharge tank, which was purged with nitrogen before being dumped into a fiberpack and purged again with a mixture of nitrogen and steam. The process conditions for each bimodal polyethylene are reported in Table 1.

TABLE 1

| Example | Comonomer | Molar Ratio of Comonomer to $C_2$ | Molar Ratio of $H_2$ to $C_2$ | Reactor Temperature (° C.) |
|---|---|---|---|---|
| Bimodal MDPE | Hexene | 0.031 | 0.0053 | 95 |
| Bimodal HDPE | Hexene | 0.021 | 0.0017 | 100 |

Properties of Polyethylene Examples

Various properties, including density, melt index ($I_2$), high load melt index ($I_{21}$), and melt flow ratio ($MFR_{21}$), of the bimodal polyethylene of Example 1, as well as various commercially available polyethylene, are reported in Table 2.

TABLE 2

| | Polymer | | | | |
|---|---|---|---|---|---|
| | Unimodal MDPE[a] | Bimodal MDPE | Bimodal HDPE | Colored PCR[b] | Natural PCR[c] |
| Density (g/cm$^3$) | 0.9350 | 0.9368 | 0.9432 | 0.9590 | 0.9620 |
| Melt Index ($I_2$) (dg/min) | 0.802 | 0.783 | 0.756 | 0.684 | 0.627 |
| High Load Melt Index ($I_{21}$) (dg/min) | 55.2 | 81.0 | 83.9 | 64.7 | 53.1 |
| Melt Flow Ratio ($MFR_{21}$) | 68.8 | 103.5 | 111.0 | 94.6 | 84.7 |

[a]Commercially available as DFNB-3580 NT from The Dow Chemical Company

[b]Commercially available from Talco Plastics

[c]Commercially available as EcoPrime ™ from Envision Plastics

Molecular Weights of Polyethylene Examples

Various molecular weights, including weight average molecular weight ($M_w$), number average molecule weight ($M_n$), and z-average molecular weight ($M_z$), of the bimodal polyethylene of Example 1, as well as various commercially available polyethylene, are reported in Table 3.

TABLE 3

| | Polymer | | | | |
|---|---|---|---|---|---|
| | Unimodal MDPE | Bimodal MDPE | Bimodal HDPE | Colored PCR | Natural PCR |
| Weight Average Molecular Weight ($M_w$) (g/mol) | 135,147 | 134,234 | 156,366 | 139,785 | 132,330 |
| Number Average Molecular Weight ($M_n$) (g/mol) | 10,462 | 12,476 | 21,188 | 4,587 | 4,751 |
| Z-Average Molecular Weight ($M_z$) (g/mol) | 2,796,164 | 735,427 | 1,295,104 | 1,819,262 | 1,330,169 |
| Molecular Weight Distribution ($M_w/M_n$) | 12.9 | 10.8 | 7.4 | 30.5 | 27.9 |
| Molecular Weight Distribution ($M_z/M_w$) | 20.7 | 5.5 | 8.3 | 13.0 | 10.1 |

Comonomer Distributions of Polyethylene Examples

The short chain branching distributions of the high molecular weight components ($SCBD_2$) and the low molecular weight components ($SCBD_1$), as well as the comonomer distributions of the bimodal polyethylene of Example 1 are reported in Table 4.

TABLE 4

| | Polymer | |
|---|---|---|
| | Bimodal MDPE | Bimodal HDPE |
| SCBD of the Low Molecular Weight Component ($SCBD_1$) | 4.0 | 1.7 |
| SCBD of the High Molecular Weight Component ($SCBD_2$) | 14.3 | 7.1 |
| Comonomer Distribution ($SCBD_1/SCBD_2$) | 3.6 | 4.3 |

Complex Viscosities of Polyethylene Examples

Various complex viscosities of the bimodal polyethylene of Example 1, as well as various commercially available polyethylene, are reported in Table 5.

TABLE 5

| | Polymer | | | | |
|---|---|---|---|---|---|
| | Unimodal MDPE | Bimodal MDPE | Bimodal HDPE | Colored PCR | Natural PCR |
| Complex Viscosity ($\eta$*0.1) (Pa · s) | 16,306 | 14,256 | 19,454 | 21,649 | 24,046 |
| Complex Viscosity ($\eta$*1.0) (Pa · s) | 7,776 | 8,892 | 9,245 | 9,118 | 9,784 |
| Complex Viscosity ($\eta$*10) (Pa · s) | 3,109 | 3,895 | 3,189 | 3,330 | 3,455 |
| Complex Viscosity ($\eta$*100) (Pa · s) | 1,015 | 1,107 | 880 | 1,011 | 1,038 |
| Shear Thinning Index ($\eta$*0.1/$\eta$*100) | 16.1 | 12.9 | 22.1 | 21.4 | 23.2 |

Molecular Weight Distributions of Polyethylene Examples

Figure 2:
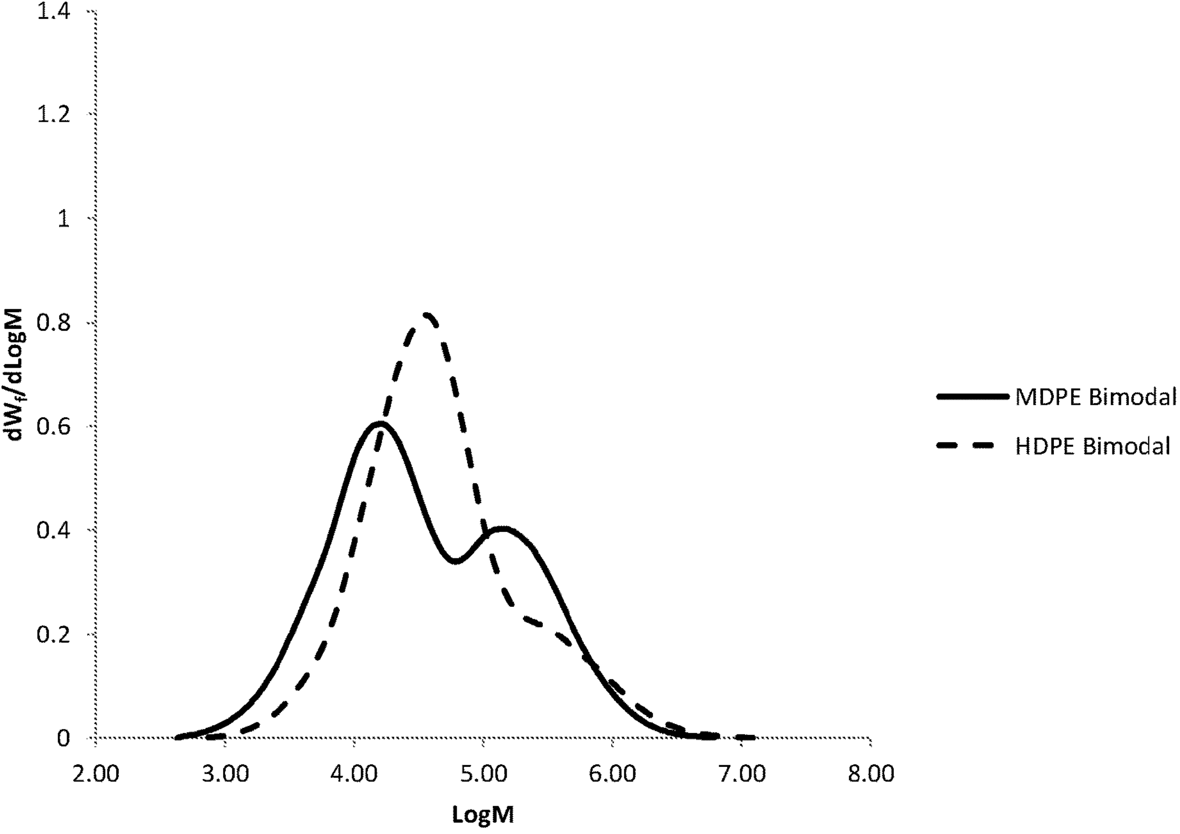
FIG. 2 graphically plots the molecular weight distributions of two other polyethylene samples, according to one or more embodiments disclosed herein.

The molecular weight distribution of the Unimodal MDPE, Colored PCR, and Natural PCR are graphically plotted in FIG. 1. The molecular weight distribution of the Bimodal MDPE, and Bimodal HDPE are graphically plotted in FIG. 2. The molecular weight distributions plotted in FIG. 1 highlight differences between recycled polyethylene, such as the Colored PCR and the Natural PCR, and virgin raw polyethylene, such as the Unimodal MDPE. In particular, both recycled polyethylene include a small weight fraction (i.e., approximately less than or equal to 10 wt. %) of lower molecular weight polymer chains with logarithm molecular weights (Log M) less than 2.5 that appear as a low molecular weight tail. In contrast, the virgin raw polyethylene includes no such fraction. Instead all (i.e., 100 wt. %) of the polymer chains of the Unimodal MDPE have a logarithm molecular weight (Log M) greater than 2.0. Similarly, all (i.e., 100 wt. %) of the polymer chains of the Bimodal MDPE and Bimodal HDPE have a logarithm molecular weight (Log M) greater than 2.0. That is, the virgin raw polyethylene does not have the low molecular weight tail of the recycled polyethylene.

Example 8

Thermoplastic compositions were prepared by mixing various polymers, including the bimodal polyethylene of Example 1, with various additives using a ¾" twin screw extruder (temperature profile of 180/190/190° C. and a 60 mesh screen pack) at 60 rotations per minute (rpm). The components of the thermoplastic compositions, as well as various properties of the thermoplastic compositions, are reported in Tables 6 and 7.

TABLE 6

| Thermoplastic Composition | C1 | 1 | 2 | 3 | C2 | 4 | 5 | 6 | C3 |
|---|---|---|---|---|---|---|---|---|---|
| Composition | | | | | | | | | |
| Unimodal MDPE (wt. %) | 94.10 | 84.70 | 70.60 | 47.05 | — | 84.70 | 70.60 | 47.05 | — |
| Natural PCR (wt. %) | — | 9.40 | 23.50 | 47.05 | 94.1 | — | — | — | — |
| Colored PCR (wt. %) | — | — | — | — | — | 9.40 | 23.50 | 47.05 | 94.1 |
| Carbon Black[1] (wt. %) | 5.70 | 5.70 | 5.70 | 5.70 | 5.70 | 5.70 | 5.70 | 5.70 | 5.70 |
| Antioxidant[2] (wt. %) | 0.18 | 0.18 | 0.18 | 0.18 | 0.18 | 0.18 | 0.18 | 0.18 | 0.18 |
| Processing Aid[3] (wt. %) | 0.02 | 0.02 | 0.02 | 0.02 | 0.02 | 0.02 | 0.02 | 0.02 | 0.02 |
| Properties | | | | | | | | | |
| Melt Index ($I_2$) (dg/min) | 0.8 | 0.7 | 0.7 | 0.7 | 0.6 | 0.8 | 0.8 | 0.8 | 0.7 |
| Flow Index ($I_{21}$) (dg/min) | 79.2 | 77.6 | 75.7 | 78.1 | 88.8 | 70.3 | 77.0 | 79.8 | 91.7 |
| Melt Flow Ratio ($I_{21}/I_2$) | 104.1 | 104.9 | 103.5 | 116.2 | 151.6 | 91.3 | 102.4 | 106.1 | 126.1 |
| Density (g/cm$^3$) | 0.9450 | 0.9500 | 0.9520 | 0.9590 | 0.9720 | 0.9490 | 0.9530 | 0.9590 | 0.9710 |
| ESCR ($F_0$) (hrs) | >4,000 | >4,000 | <216 | <48 | <24 | >4,000 | <2,712 | <192 | <24 |
| Tensile Strength at Break (psi) | 3,939.4 | 3,585.2 | 2,877.6 | 2,994.0 | 1,974.8 | 3,802.8 | 2,956.4 | 2,126.8 | 2,193.5 |
| Elongation at Break (%) | 952.0 | 885.2 | 798.6 | 898.6 | 431.0 | 906.4 | 879.8 | 674.8 | 66.2 |
| Secant Modulus ($E_s$) (psi) | 62,194 | 91,901 | 107,733 | 123,949 | 224,449 | 79,821 | 91,425 | 122,498 | 191,833 |
| Wire Smoothness (μ-in) | 9.6 | 8.6 | 8.2 | 9.8 | 10.7 | 10.9 | 9.8 | 13.6 | 18.0 |

[1]Commercially available as AXELERON ™ GP A-0037 BK CPD from The Dow Chemical Company
[2]Commercially available as NAUGARD ® Super Q from Addivant
[3]Commercially available as Dynamar from 3M

TABLE 7

| Thermoplastic Composition | C4 | 7 | 8 | 9 | C5 | C6 | 10 | 11 | 12 | C7 |
|---|---|---|---|---|---|---|---|---|---|---|
| Composition | | | | | | | | | | |
| Bimodal MDPE (wt. %) | 94.10 | 70.60 | 47.05 | 23.50 | 9.40 | — | — | — | — | — |
| Bimodal HDPE (wt. %) | — | — | — | — | — | 94.10 | 70.60 | 47.05 | 23.50 | 9.40 |
| Colored PCR (wt. %) | — | 23.50 | 47.05 | 70.60 | 84.70 | — | 23.50 | 47.05 | 70.60 | 84.7 |
| Carbon Black (wt. %) | 5.70 | 5.70 | 5.70 | 5.70 | 5.70 | 5.70 | 5.70 | 5.70 | 5.70 | 5.70 |
| Antioxidant (wt. %) | 0.18 | 0.18 | 0.18 | 0.18 | 0.18 | 0.18 | 0.18 | 0.18 | 0.18 | 0.18 |
| Processing Aid (wt. %) | 0.02 | 0.02 | 0.02 | 0.02 | 0.02 | 0.02 | 0.02 | 0.02 | 0.02 | 0.02 |
| Properties | | | | | | | | | | |
| Melt Index ($I_2$) (dg/min) | 0.9 | 0.8 | 0.7 | 0.7 | 0.7 | 0.8 | 0.7 | 0.7 | 0.7 | 0.7 |
| Flow Index ($I_{21}$) (dg/min) | 96.5 | 79.2 | 68.9 | 64.3 | 68.0 | 86.5 | 69.5 | 75.5 | 67.9 | 66.8 |
| Melt Flow Ratio ($I_{21}/I_2$) | 106.9 | 98.6 | 93.7 | 90.6 | 94.4 | 109.4 | 95.5 | 110.0 | 96.3 | 97.0 |
| Density (g/cm$^3$) | 0.9480 | 0.9530 | 0.9580 | 0.9630 | 0.9670 | 0.9560 | 0.9580 | 0.9610 | 0.9630 | 0.9670 |
| ESCR ($F_0$) (hrs) | >4,000 | >4,000 | <2,232 | <72 | <24 | >4,000 | <1,128 | <168 | <48 | <24 |
| Tensile Strength at Break (psi) | 3,802.2 | 3,061.6 | 2,330.2 | 1,881.2 | 1,949.0 | 3,941.8 | 2,182.5 | 2,127.4 | 1,441.6 | 1,354.4 |

TABLE 7-continued

| Thermoplastic Composition | C4 | 7 | 8 | 9 | C5 | C6 | 10 | 11 | 12 | C7 |
|---|---|---|---|---|---|---|---|---|---|---|
| Elongation at Break (%) | 650.6 | 690.6 | 580.4 | 333.0 | 448.4 | 724.6 | 571.5 | 528.2 | 315.6 | 236.0 |
| Secant Modulus ($E_s$) (psi) | 99,881 | 175,191 | 173,355 | 1,447,388 | 110,884 | 59,952 | 222,966 | 179,214 | 190,194 | 118,569 |
| Wire Smoothness (μ-in) | 15.6 | 13.9 | 13.2 | 11.9 | 13.7 | 13.5 | 12.2 | 10.6 | 13.6 | 13.5 |

As shown in Tables 6 and 7, thermoplastic compositions C2 and C3, which include only recycled polyethylene, have an unacceptable combination of Environmental Stress-Cracking Resistance (ESCR) values (i.e., less than 24 hours) and mechanical properties, which make them unsuitable for use in various applications despite their sustainability. However, as increasing amounts of virgin raw polyethylene are mixed with the recycled polyethylene these values improve. For example, as shown in Table 6, thermoplastic compositions including from 47.05 wt. % to 84.70 wt. % of virgin raw polyethylene have an acceptable combination of both Environmental Stress-Cracking Resistance (ESCR) values and mechanical properties, such as tensile strengths at break greater than 1,400 psi and elongations at break greater than 200%. Similarly, as shown in Table 7, thermoplastic compositions including from 23.50 wt. % to 70.60 wt. % of virgin raw polyethylene have an acceptable combination of both Environmental Stress-Cracking Resistance (ESCR) values and mechanical properties.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 g/cm$^3$" is intended to mean "about 40 g/cm$^3$."

Notations used in the equations included herein refer to their standard meaning as understood in the field of mathematics. For example, "=" means equal to, "×" denotes the multiplication operation, "+" denotes the addition operation, "−" denotes the subtraction operation, ">" is a "greater than" sign, "<" is a "less than" sign, "and "/" denotes the division operation.

Every document cited herein, if any, including any cross-referenced or related patent or patent application and any patent or patent application to which this application claims priority or benefit thereof, is hereby incorporated herein by reference in its entirety unless expressly excluded or otherwise limited. The citation of any document is not an admission that it is prior art with respect to any embodiment disclosed or claimed herein or that it alone, or in any combination with any other reference or references, teaches, suggests or discloses any such embodiment. Further, to the extent that any meaning or definition of a term in this document conflicts with any meaning or definition of the same term in a document incorporated by reference, the meaning or definition assigned to that term in this document shall govern.

The invention claimed is:

1. A thermoplastic composition comprising: from 0.5 wt % to 75.0 wt. % of a recycled polyethylene comprising a blend of polyethylene recovered from post-consumer material, pre-consumer material, or combinations thereof; and from 25.0 wt. % to 99.5 wt % of virgin raw polyethylene comprising unimodal polyethylene, bimodal polyethylene, or combinations thereof, wherein:

the recycled polyethylene has:

a density of from 0.920 g/cm$^3$ to 0.975 g/cm$^3$ when measured according to ASTM D792-08, Method B;

a melt index ($I_2$) of from 0.30 dg/min to 3.00 dg/min when measured according to ASTM D1238-10, Method B, at 190° C. and a 2.16 kg load;

a melt flow ratio ($MFR_{21}$) greater than or equal to 50, wherein the melt flow ratio ($MFR_{21}$) is a ratio of a high load melt index ($I_{21}$) of the recycled polyethylene to the melt index ($I_2$), and the high load melt index ($I_{21}$) is measured according to ASTM D1238-10, Method B, at 190° C. and a 21.6 kg load;

a melting point ($T_m$) of from 105° C. to 135° C. when measured by Dynamic Scanning calorimetry (DSC) according to ASTM D3418-15; and from 0.1 wt. % to 10 wt. % of polymer chains having a logarithm molecular weight (Log M) less than 2.5 when measured using gel permeation chromatography (GPC);

the unimodal polyethylene has:

a density of from 0.930 g/cm$^3$ to 0.950 g/cm$^3$ when measured according to ASTM D792-08, Method B;

a melt index ($I_2$) of from 0.30 dg/min to 1.00 dg/min when measured according to ASTM D1238-10, Method B, at 190° C. and a 2.16 kg load; and a melt flow ratio ($MFR_{21}$) greater than or equal to 30, wherein the melt flow ratio ($MFR_{21}$) is a ratio of a high load melt index ($I_{21}$) of the unimodal polyethylene to the melt index ($I_2$), and the high load melt index ($I_{21}$) is measured according to ASTM D1238-10, Method B, at 190° C. and a 21.6 kg load;

the bimodal polyethylene has:

a density of from 0.933 g/cm$^3$ to 0.960 g/cm$^3$ when measured according to ASTM D792-08, Method B;

a melt index ($I_2$) of from 0.30 dg/min to 2.00 dg/min when measured according to ASTM D1238-10, Method B, at 190° C. and a 2.16 kg load;

a melt flow ratio ($MFR_{21}$) greater than or equal to 80.0, wherein the melt flow ratio ($MFR_{21}$) is a ratio of a high load melt index ($I_{21}$) of the bimodal polyethylene to the melt index ($I_2$), and the high load melt index ($I_{21}$) is measured according to ASTM D1238-10, Method B, at 190° C. and a 21.6 kg load;

a molecular weight distribution ($M_w/M_n$) greater than or equal to 6, wherein the molecular weight distribution ($M_w/M_n$) is a ratio of a weight average molecular weight ($M_w$) of the bimodal polyethylene to a number average molecular weight ($M_n$) of the bimodal polyethylene, and the weight average molecular weight ($M_w$) and the number average molecular weight ($M_n$) are measured using gel permeation chromatography (GPC); and a reverse comonomer distribution, wherein a ratio of a short chain branching distribution of the high molecular weight component ($SCBD_2$) to a short chain branching distribution of the low molecular weight component ($SCBD_1$) is greater than 1.0, and the short chain branching distribution of the high molecular weight component ($SCBD_2$) and the short chain branching distribution of the low molecular weight component ($SCBD_1$) are measured using gel permeation chromatography (GPC); and at least 90.0 wt. % of the thermoplastic composition is comprised of the recycled polyethylene and the virgin raw polyethylene.

2. The thermoplastic composition of claim 1, wherein the unimodal polyethylene has a melting temperature ($T_m$) of from 120° C. to 130° C. when measured by Dynamic Scanning calorimetry (DSC) according to ASTM D3418-15.

3. The thermoplastic composition of claim 1, wherein the virgin polyethylene is the unimodal polyethylene.

4. The thermoplastic composition of claim 1, wherein the virgin raw polyethylene is the bimodal polyethylene.

5. The thermoplastic composition of claim 1, further comprising up to 10 wt. % of one or more additives, based on the total weight of the thermoplastic composition.

6. The thermoplastic composition of claim 5, wherein the additives comprise 0.01 wt. % to 0.5 wt. % of antioxidant, based on the total weight of the thermoplastic composition.

7. The thermoplastic composition of claim 5, wherein the additives comprise 0.05 wt. % to 9 wt. % carbon black, based on the total weight of the thermoplastic composition.

8. The thermoplastic composition of claim 1, wherein the thermoplastic composition comprises 5.0 wt. % to 50.0 wt. % of the recycled polyethylene and from 45.0 wt. % to 95.0 wt. % of the virgin raw polyethylene.

9. A method of making the thermoplastic composition of claim 1, the method comprising melt-blending the recycled polyethylene, the virgin polyethylene, and any optional additives, thereby making the thermoplastic composition.

10. A manufactured article comprising the thermoplastic composition of claim 1.

11. The manufactured article of claim 10, wherein the thermoplastic composition exhibits one or more of the following:

an average tensile strength at break greater than or equal to 1,400 psi when measured according to ASTM D638-14, Type IV;

an elongation at break greater than or equal to 200% when measured according to ASTM D638-14, Type IV;

an environmental stress-cracking resistance (ESCR) ($F_0$) greater than or equal to 24 hours when measured according to ASTM D1693-1, Method B, in a 10% Igepal solution at 50° C.; and a secant modulus ($E_s$) greater than 450 MPa when measured according to ASTM D790-17.

12. The manufactured article of claim 10, further comprising a coating and a support component, wherein the coating comprises the thermoplastic composition and is disposed on or in the support component.

13. A coated conductor comprising a coating layer and a conductive core, wherein the coating layer comprises the thermoplastic composition of claim 1 and covers at least a portion of the conductive core.

14. A method of transmitting electricity and/or light through a conductive core of the coated conductor of claim 13, wherein the conductive core comprises a metallic wire, an optical fiber, or both; the method comprising step (a) and/or step (b): (a) applying a voltage across the metallic wire, thereby causing electrical energy to flow through the metallic wire; and/or (b) sending a pulse of light through the optical fiber, thereby causing light to transmit through the optical fiber; thereby transmitting electricity and/or light, respectively, through a conductive core of the coated conductor.

* * * * *